July 31, 1956
C. A. LEE
2,756,650
FLOW CONTROL APPARATUS
Filed Nov. 21, 1950
7 Sheets-Sheet 1
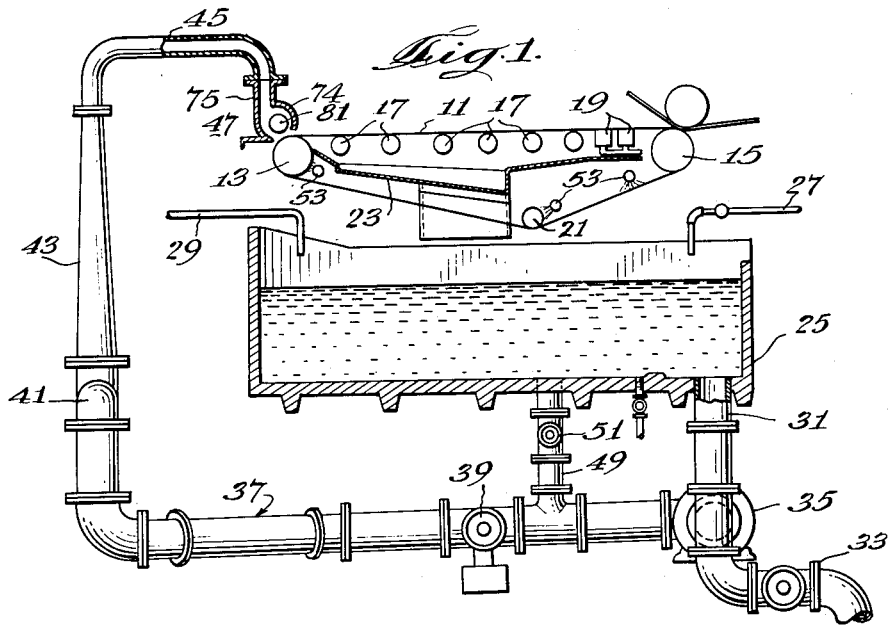
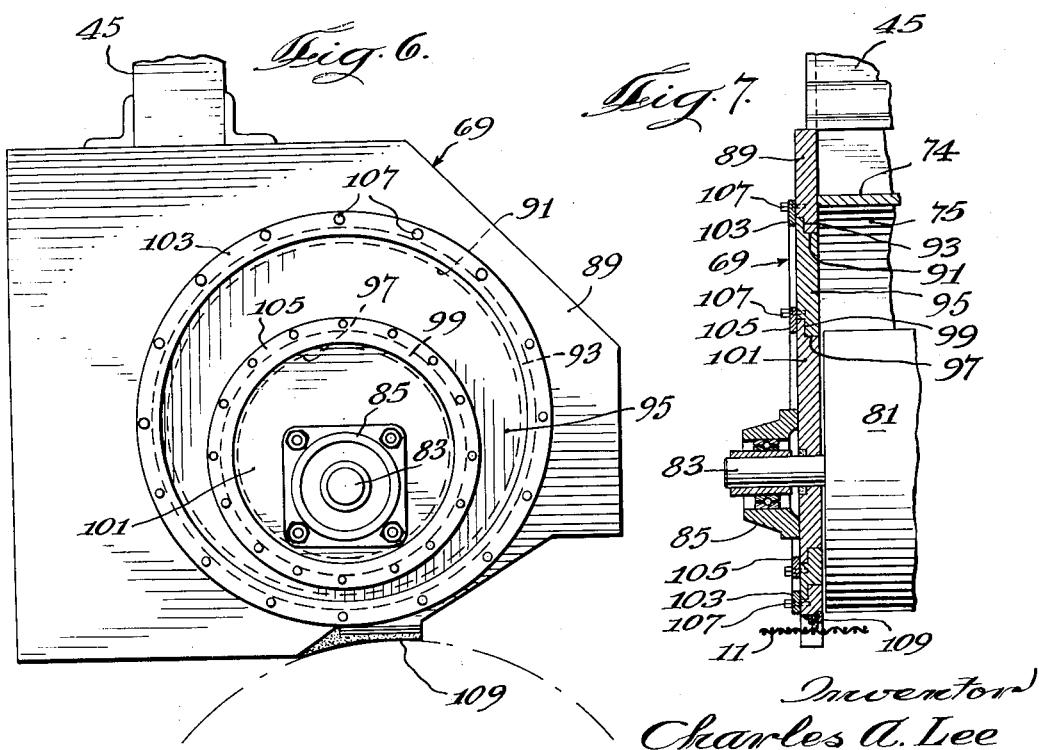
Inventor
Charles A. Lee
By Doane, Glaister & Anderson
Attorneys

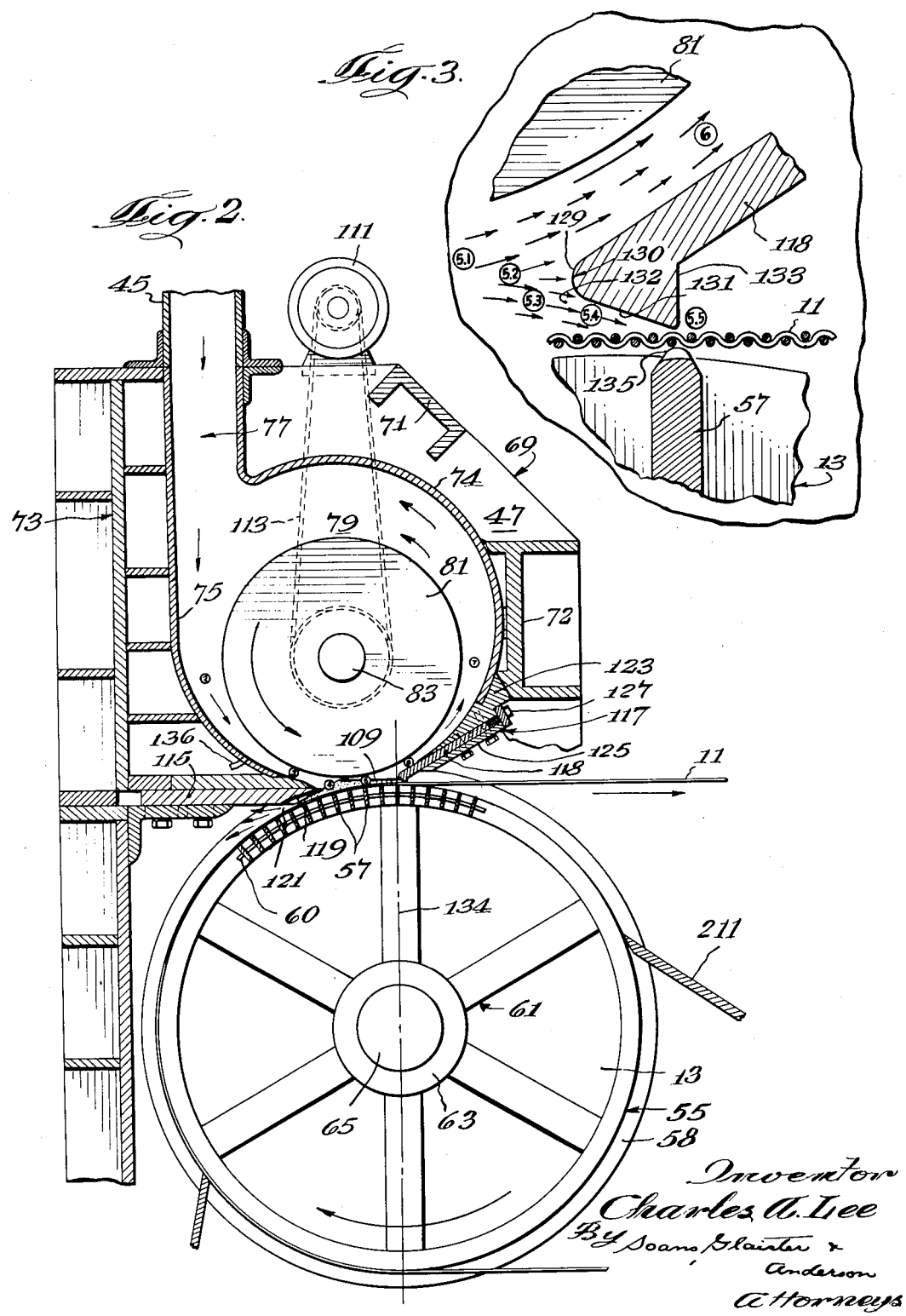

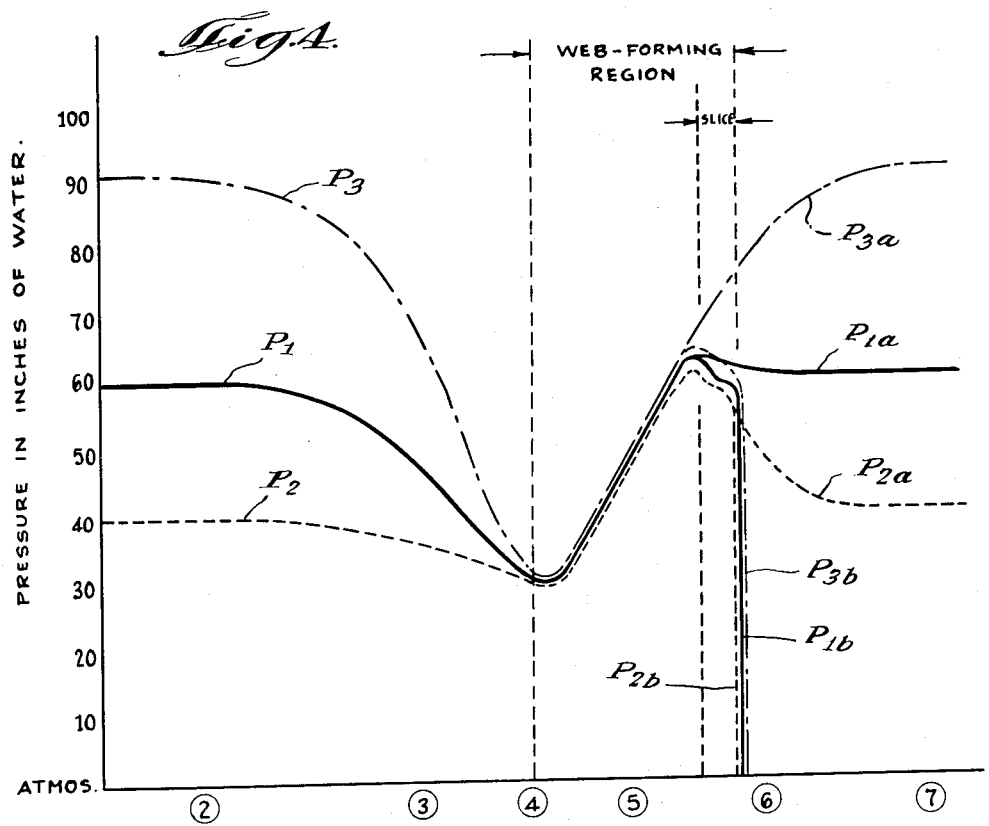
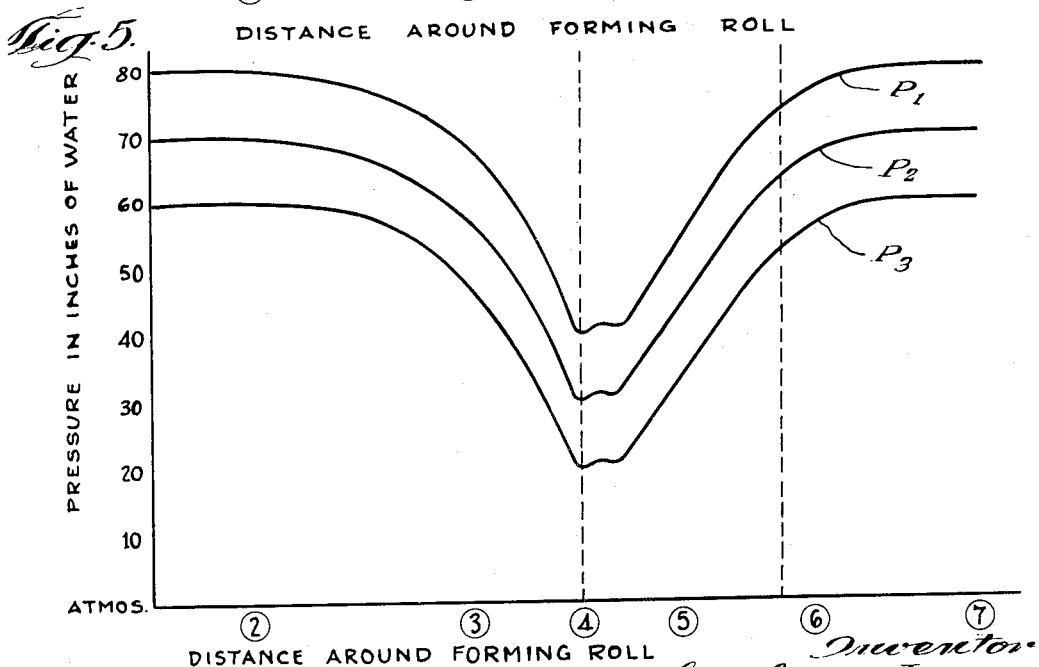

July 31, 1956 C. A. LEE 2,756,650
FLOW CONTROL APPARATUS
Filed Nov. 21, 1950 7 Sheets-Sheet 4

Inventor
Charles A. Lee
By Soans, Glaister & Anderson
Attorneys

July 31, 1956  C. A. LEE  2,756,650
FLOW CONTROL APPARATUS
Filed Nov. 21, 1950  7 Sheets-Sheet 5

Inventor
Charles A. Lee
By Soans, Glaister & Anderson
Attorneys

July 31, 1956 C. A. LEE 2,756,650
FLOW CONTROL APPARATUS
Filed Nov. 21, 1950 7 Sheets-Sheet 7

Inventor
Charles A. Lee
By Soans, Glaister, Anderson
Attorneys

United States Patent Office

2,756,650
Patented July 31, 1956

2,756,650

FLOW CONTROL APPARATUS

Charles A. Lee, Neenah, Wis., assignor, by mesne assignments, to Kimberly-Clark Corporation, a corporation of Delaware Application November 21, 1950, Serial No. 196,893

18 Claims. (Cl. 92—44)

The present invention, in its broadest sense, relates to the manufacture of felted web and sheet products from fluid suspensions of fibrous materials. The invention has particular utility in the manufacture of paper, and especially in the manufacture of paper on Fourdrinier papermaking machines of the inlet or pressure-forming type, i. e. on papermaking machines wherein the fiber suspension or stock is supplied to a web-forming region on a Fourdrinier wire as a relatively high energy, flowing stream which may be under substantial hydraulic pressure.

Prior to the development of the inlet or pressure-forming type papermaking machine, it was the general practice in the operation of Fourdrinier papermaking machines to form the mat of fibers of which the paper web is composed by applying to the upper surface of the Fourdrinier wire, as by flowing thereon, a layer of stock which was then permitted to drain through the wire. The stock contained the required amount of fiber in an amount of water which was sufficient to produce the proper distribution of the fibers in the web, and sufficient drainage time was provided to produce a coherent web or sheet which was capable of being couched-off the end of the wire. Various arrangements, including suction boxes, table rolls and water doctors were disposed beneath the wire for increasing the rate of drainage therethrough, and since there was no substantial pressure differential in the web-forming region along the wire, the speed of operation of the machine was determined primarily by the capacity and efficacy of the drainage means.

In the inlet or pressure-forming machines, examples of which are shown in U. S. Patents Nos. 2,060,808, 2,264,891 and 2,308,370, the stock is applied to a narrow section of the wire as a confined, relatively high energy flowing stream, usually under substantial hydraulic pressure, and a large proportion of the water in the stock mixture is thereby forced through the wire at relatively high velocity in the web-forming region. This arrangement has made possible very high speed operation of machines wherein it is used, primarily because it makes possible the drainage of a relatively large percentage of the water from the web in a very short interval of time. In addition, since the web-forming region occupies a relatively short portion of the length of the Fourdrinier wire, it is possible to provide papermaking machines which can be operated at high speed with comparatively short forming wires. Also, as compared with certain of the earlier machines, it is possible to obtain somewhat improved formation.

Because of these important advantages, and especially the advantage of increased operational speed, a considerable number of papermaking machines embodying the pressure-forming or inlet principle have come into use in the papermaking industry. These machines, however, are not completely free from operational difficulties, especially when they are operated at speeds in excess of about 1500 to 2000 feet per minute. One such difficulty, which is quite generally encountered, is the existence of cyclic or intermittent conditions or flow instability in, or adjacent to, the web-forming region. This condition is discussed at some length in my prior application S. N. 121,525, which was filed on October 15, 1949, and which is assigned to the assignee of this invention. Also, in that application, arrangements for over-coming this type of instability are disclosed, and certain operational principles in connection therewith are set forth. Use of these structural arrangements and operational principles has been found to materially improve the operation of pressure inlet machines in which they are embodied, and has made possible substantially increased operational speeds.

However, theoretical and other investigations have shown that the formation of fibrous webs from fluid suspensions should be capable of accomplishment at much higher speeds and with much better control of the character and arrangement of the constituent fibers of the web than has heretofore been possible, even, for example, in inlet type papermaking machines embodying the improvements of my said application S. N. 121,525.

The present invention has resulted from these investigations and has for its principal object the provision of improved apparatus and methods for the formation of fibrous webs from fluid suspensions of fibrous materials. More specifically, the invention includes the discovery that much higher operating speeds and greatly improved web formation can be accomplished, as for example in inlet or pressure-forming type papermaking machines, by the use of apparatus which is capable of positively controlling and adjusting the pressure and velocity (including direction of flow) of the fiber suspension in the web-forming region of the apparatus, in accordance with certain principles to be hereinafter set forth. The inventive concept involves the use of mechanical means which acts upon the fluid suspension of fibers in the web-forming region to determine and to effect control of the pressure and velocity relationships in that region.

Since the invention finds particular and immediate application to inlet or pressure-forming type papermaking machines, as above noted, the illustrative embodiments of the invention herein illustrated and described, constitute examples of the invention as applied to such machines. It will be understood, however, that the invention is capable of more general application in the field of web-formation from fluid suspensions of fibrous materials.

In effecting control of the pressure and velocity relationships in the fluid suspension delivered to the web-forming region in the illustrated examples of the invention, use is made of a cylindrical rotor or equivalent member, which is positioned adjacent to, and in a generally tangential relationship with, the web-forming region, and an enclosure for this cylinder, which receives the fluid suspension and which is open to the web-forming region. The rotor and the enclosure are so positioned with relation to each other that they define surfaces which approximate stream lines of flow under conditions of potential flow.

In these structures, it has been found that certain critical relationships exist between the dimensions of the enclosure for the rotor, the flow passageways, the peripheral speed of the rotor, the speed of movement of the forming wire, the dimensions of the web-forming region, and the spacing of the rotor and the forming wire. The pressure at which the fibrous suspension is delivered to the apparatus is also an important consideration which must be correlated with the other factors noted above, and it will be found desirable in the usual pressure-forming papermaking apparatus to provide for back-flow along the forming wire ahead of the web-forming region, in accordance with my said application S. N. 121,525.

Referring to the drawings, wherein there are illustrated certain embodiments of the invention, as applied especially to pressure-forming or inlet type papermaking machines, Figure 1 is a schematic view, partially in vertical section and partially in side elevation, of the wet-end of a Fourdrinier, inlet type papermaking machine, embodying certain of the features of the invention, and certain accessory equipment therefor;

Figure 2 is an enlarged, vertical cross-sectional view of the machine illustrated in Figure 1, this view showing certain of the details and features of the web-forming mechanism, in accordance with the invention, which is embodied in that machine;

Figure 3 is an enlarged, fragmentary, sectional view, showing certain features of the front slice and adjacent portion of the apparatus of Figures 1 and 2;

Figures 4, 5 and 5a are curves illustrating certain of the pressure relationships existing, under various operating conditions, in the web-forming region of the apparatus shown in Figures 1 and 2;

Figures 6 and 7 are, respectively, elevational and sectional views illustrating certain of the details of the forming roll positioning and adjusting means embodied in the apparatus of Figure 2;

Figure 5A:
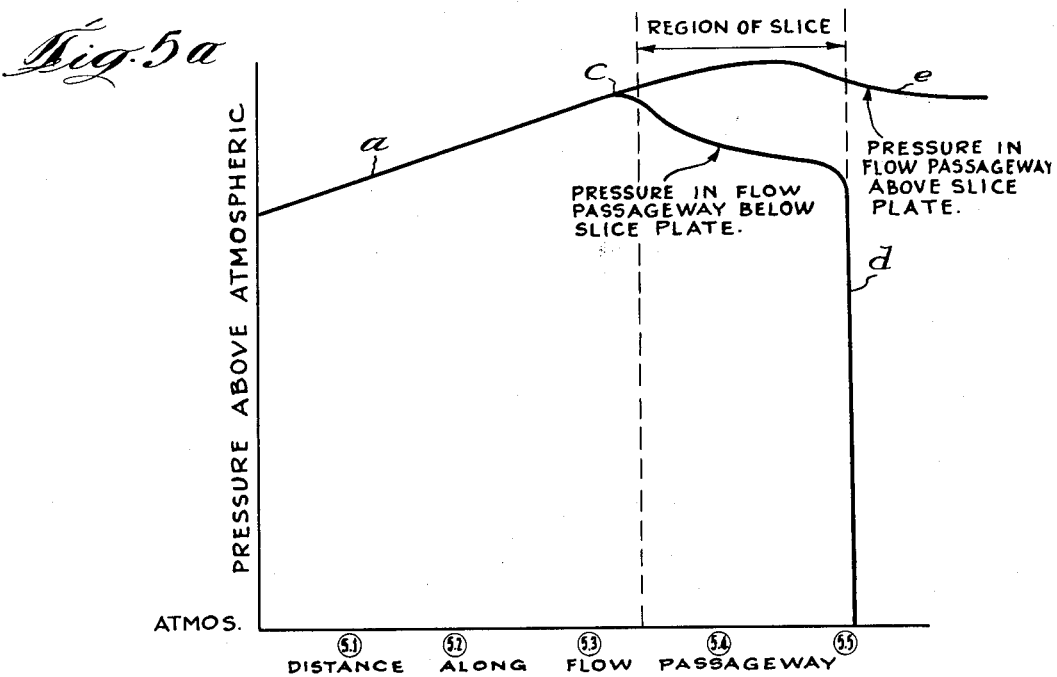
Figure 8:
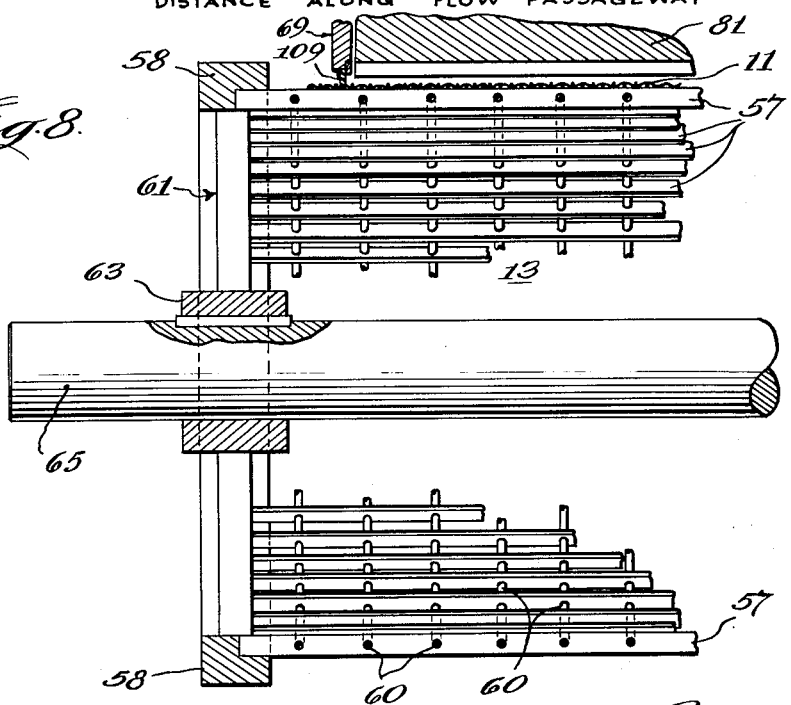
Figure 8 is a sectional view illustrating certain details of the breast roll structure of the machine illustrated in Figures 1 and 2.

As previously stated, the present invention is based on the discovery that materially improved web formation, and greatly increased operational speeds, can be attained in apparatus wherein fibrous webs are being formed on a moving wire or other web-forming member by the use of fluid suspensions of fibrous material, by establishing certain pressure and velocity relationships within the web-forming region. More particularly, the invention provides means in the web-forming region which is capable of providing a flow velocity within the web forming region that is substantially equal to the velocity of the wire or other web forming member, while at the same time, providing increasing fluid pressure within the web forming region in the direction of wire movement, the pressure within the web forming region being sufficient, at all times, to effect proper flow through the mat of fibers being formed on the web forming member. The attainment of these conditions involves the provision of means in the web-forming region which is capable of controlling the pressure and velocity of the flowing stream of fiber bearing fluid delivered to that region, independently of the movement of the wire or other forming member, and independently of each other. The accomplishment of the invention requires the addition to the flowing stream of fluid in the web-forming region, of substantial amounts of energy, and most conveniently this energy is supplied to that region by means of a cylindrical rotor located in proximity to the wire or other forming member.

In addition to the use of a rotor or equivalent means for determining and controlling the pressure and velocity relationships within the web-forming region, the accomplishing of the invention has been found to require the provision of certain boundary conditions within at least that portion of the flow conduit which is adjacent the rotor and the web-forming region. Also in order to attain the maximum operational stability, it has been found very advantageous to cause a portion of the fluid delivered to the web-forming region to flow backwardly along the wire or other web-forming member, ahead of the web-forming region, and otherwise to control and direct the flow of fluid with reference to the web-forming member.

The diagrammatic view, Figure 1, illustrates the general arrangement of a pressure-forming or inlet papermaking machine of the general type to which the present invention has particular application. As there shown, the Fourdrinier wire 11 is supported upon an open or suction type breast roll 13 and a couch roll 15, and is adapted to pass over a plurality of spaced table rolls 17 and suction boxes 19. The wire 11 is tensioned by additional guide or tensioning rolls as illustrated at 21. A tray 23, which is adapted to collect the white water (i. e., the liquid which drains through the wire) is disposed within the upper and lower portions of the wire 11, as illustrated, and this tray is arranged to discharge into a mixing tank 25 which is normally maintained about three-quarters filled. Fresh water for make-up purposes may be added to the mixing tank 25 through the pipe 27, and additional stock as is necessary to maintain the proper consistency (or fiber concentration) of the fluid suspension or stock delivered to the web-forming region is added through a suitable inlet pipe 29.

The bottom of the mixing tank 25 is inclined, as shown, and a main flow line 31 connects to the tank at the lower end thereof. The main flow line includes a valved branch 33 for use in draining the mixing tank, and the main flow line also connects with the inflow end of a stock or fan pump 35, which is the principal means relied upon to deliver stock to the web-forming region. The outlet of the fan pump 35 is connected to the inlet structure by suitable piping indicated generally at 37. Included in this piping is an automatically operable pressure regulating valve 39, a transition section 41, which converts the circular cross-section stream delivered by the fan pump 35 and piping 37 to a stream of square or rectangular cross-sectional outline, and a flow spreader 43, which may, for example, be similar to the flow spreader shown in Johnson and Lee application S. N. 118,744. The flow spreader accomplishes the function of converting the uniformly dimensioned stream delivered by the transition section 41 into a relatively shallow stream of rectangular cross-section which desirably has a transverse width substantially equal to the cross-machine width of the web-forming region of the machine. The outlet end of the flow spreader 43 is connected to the web-forming region of the machine by a conduit 45, having a rectangular cross section of the same dimensions as the outlet end of the flow spreader 43, and a flow control unit 47, which embodies various of the features of the present invention.

The piping 37 also includes a by-pass line 49 which connects the outlet side of the fan pump 35, upstream of the pressure regulating valve 39, with the mixing tank 25, as shown. The by-pass line 49 includes a shut-off valve 51. Suitable showers or sprays indicated generally at 53 are provided for effecting continuous cleaning of the rolls and wire in accordance with usual papermaking practice.

In the particular apparatus shown in Figures 1 and 2, the breast roll 13 is of the open-surfaced type. It may, for example, be generally similar to the open-surfaced breast rolls illustrated and described in U. S. Patents Nos. 1,808,055, 2,118,491 and 2,154,719. The particular structure illustrated in the drawings includes a reticulated outer shell 55 which may comprise a series of spaced bar members 57 supported on suitable annular headers 58 and interconnected by tie members 60. The headers 58 are in turn supported upon spoked members 61 which are provided with hub portions 63 for engaging a roll support shaft 65 which extends centrally of the roll. The hub portions 63 are keyed or otherwise attached to the central supporting shaft 65 and, in addition to the spoked supports at either end of the roll, one or more central supports may be provided to give increased rigidity to the structure. It will be understood that the particular structural design of the reticulated shell 55 is not a feature of the present invention, and any structure which is capable of suitably supporting the forming wire 11 while at the same time providing uniform flow of stock through the wire may be used.

The flow control unit 47 connects with the stock conduit 45 and coacts therewith to deliver a flowing stream of stock to the web-forming region of the machine. The structure of the flow control unit includes a pair of side wall units 69 which are integrally connected together by suitable structural members 71 and 72 and by portions of the main frame of the machine, illustrated generally at 73. Secured in a liquid tight manner to and between the side walls 69 are formed plate members 74 and 75 which, with the side walls 69, define the walls of the flow passageway through which the stock is conducted to the web-forming region. As shown particularly in Figure 2, this flow passageway includes a first portion 77 adapted to connect with the conduit 45 leading to the discharge end of the flow spreader 43, this portion being of rectangular cross-sectional area, and having a width which is substantially equal to the transverse width of the wire 11. The initial portion 77 of the flow passageway opens into a chamber 79 of substantially increased cross sectional area, the chamber 79 in the illustrated structure having the form of a horizontally disposed, right, circular cylinder, one of the surface elements of which extends approximately tangent to the breast roll 13 in the web-forming region of the machine.

Within the cylindrical portion 79 of the flow passageway there is located a solid-surfaced roll 81 which constitutes the main flow control element of the apparatus, and which, in view of its function, is herein designated as the forming roll. The forming roll 81 includes a shaft 83, and this shaft is supported at either end by suitable bearings 85 which, in turn, are adjustably supported on the vertical side walls 69 of the inlet structure by means which permits adjustment of the relative position of the forming roll 81 and the wall means defining the cylindrical chamber portion 79 of the flow conduit. The diameter of the forming roll 81 is less than the diameter of the cylindrical forming roll chamber 79, and under certain operating conditions, the axis of the forming roll is eccentrically disposed relative to the axis of that chamber.

The means provided for adjusting the position of the forming roll 81 within the forming roll chamber 79 is illustrated particularly in Figures 6 and 7. As shown in those views, each of the plate sections 89 which comprise the main structural elements of the side walls 69 is provided with a circular opening 91 having an under-cut edge 93 which is adapted to receive a circular plate 95. The circular plate 95 is in turn provided with a circular opening 97, which also has an under-cut edge, as illustrated at 99, and this opening is adapted to receive a second circular plate 101, as shown. The opening 97 in the plate 95 is eccentrically located with respect to the plate 95, and the bearings 85 for the forming roll 81 are mounted eccentrically with relation to the inner plate 101. In order to support and to lock the two plates 95 and 101 which interfit within each other in a selected position, retaining rings 103 and 105, which are fastened respectively to the side plates 89 and to the larger plates 95, by spaced screw fastenings 107, are provided.

The arrangement constitutes a convenient means whereby either the inner plates 101 or the outer plates 95 can be rotated independently of each other to adjust the position of the support bearings 85 for the forming roll 81, and thereby the position of that roll within the forming chamber 79. Other adjustable support means for the forming roll may, of course, be used, if desired. It will be found advantageous to provide some type of edge seal between the lower defining surfaces of the side plates 89 and the forming wire 11. This may comprise rubber shoe members 109 mounted on the side plates 89, as shown, or other sealing means of known types can be used.

A variable speed motor, shown generally at 111 in Figure 2, is connected to one end of the forming roll shaft 83 by a suitable belt or other drive means 113, in order that the forming roll 81 can be rotated at predetermined speed during the operation of the apparatus.

The outline and dimensions of the flowing stream of stock which is discharged from the flow control unit 47 onto the forming wire 11 and breast roll 13 are defined by the side walls 69, by an apron plate 115 which extends transversely across the machine, and by a slice structure 117, which also extends transversely across the machine and which includes a slice plate 118. The flowing stream of stock discharged from the flow control unit 47 thus constitutes an elongated, relatively narrow stream which, in a plane parallel to the wire 11, is rectangular in cross section and has substantially the same dimensions as the web-forming region on the wire. Both the apron plate 115 and the slice plate 118 are adjustable toward and away from each other in order that the dimensions of the stream of stock, and hence the dimensions of the web-forming region, can be varied within reasonable limits.

It is also desirable that the breast roll 13 be supported in such manner that its position relative to the flow control unit 47, can be accurately adjusted, this making possible very close control and adjustment of the dimensions of the web-forming region and the flow passageways adjacent that region. This adjustment of the position of the breast roll is most easily accomplished by the use of an automatically operable, adjustable roll support of a hydraulic or other type for that roll. These mechanisms are commercially available and will not be described in detail.

The upper surface of the apron plate 115 merges smoothly into the adjacent surface of the other defining elements for the cylindrical portion 79 of the flow conduit and the lower surface of the outer or lip portion 119 of the apron plate is cut-away, as shown. Desirably, this surface is curved, so as to provide with the adjacent surface of the wire 11, as it is supported on the breast roll 13, a passageway 121 of increasing cross sectional area in the direction opposite the direction of movement of the wire.

The slice structure 117 is supported upon the beam 72 and the associated structural member 123, and the slice plate 118 is slidably supported upon the member 123 by a guide plate 125 and suitable screw fastenings. Adjusting screws 127 provide a convenient means for moving the slice plate 118 toward and away from the wire 11 and the breast roll 13. The edge of the slice plate which is first contacted by the flowing stream of fluid during normal operation of the apparatus (the surface 129 in Figure 3) is blunted; it may, for example, be arcuate in form. This is done in order that a line of stagnation points, i. e. a line of points where the average flow is zero, will be formed transversely across the machine at approximately the region indicated at 130 in that figure. As will hereinafter appear, the net effect of the arrangement is to effect a stable division of the flow which reaches the slice.

The desired flow condition will be approximated by shaping the edge surface 129 to a substantially cylindrical form. For example, in a papermaking machine handling stock at the consistencies usually employed in the machine of the invention (under about .4%), which machine was being used in the manufacture of medium or lightweight paper at speeds within the range of from 1,000 to 2,000 feet per minute, the surface 129 constituted a segment of a cylinder having a radius within the range of from about ⅛ to ½ inch.

The contour and dimensions of the slice surface 131 which overlies the forming wire 11 in the region downstream of the slice surface 129 have been found to have an important effect on the operation of the apparatus. Due to the progressive drainage through the web and the forming wire 11, the stock consistency increases in the region of the slice to such an extent that the flow in this region is believed to be essentially plastic flow. Thus, the formed web is, in effect, extruded under the slice, and to prevent scuffing or other damage to the web, this extrusion must be effected at a velocity which is substantially equal to the wire speed; at the same time there must be at least some fluid flow under the edge or lip of the slice to lubricate the web as it passes thereunder.

In certain particularly satisfactory embodiments of the invention used in the manufacture of paper, the use in this region of a flat, inclined surface 131, which extends toward the adjacent surface of the forming wire, and which defines with that surface a flow passageway 132 of substantial length and of constantly decreasing cross-sectional area, has been found to be especially advantageous. The arrangement assures the maintenance of a flow velocity equal to the wire speed, under conditions of plastic flow, in the region immediately behind the lip of the slice plate, and at the same time, it extrudes the formed web under the slice lip with a minimum of scuffing or other web disturbance. The lip of the slice plate is defined, in the illustrated structure, by a vertically extending edge surface 133 which merges into the inclined surface 131, as shown in Figure 3.

The angle between the surface 131 and the underlying wire surface, which angle defines the rate at which the cross-sectional area of the flow passageway 132 decreases, may vary, for papermaking operations involving the manufacture of tissue and book type papers from stock having a consistency within the stated range of about .05 to .4, at speeds from 1,000 to 3,000 feet per minute, over fairly wide limits. Particularly satisfactory results have been obtained, however, by a construction wherein this angle is within the range of from about 5° to 45°. Under these conditions, the passageway 132 has a length, in the direction of flow, at least equal to its depth at the inflow end.

The actual pressure relationships in a representative structure are illustrated in Figure 5a which is keyed to Figure 3 by the numerals 5.1 to 5.5, each of which is enclosed in a circle and positioned along the axis of abscissas. As there shown, the curve a—c—d represents the pressure along the general path of flow from the region 5.1 to 5.5. At the slice lip, the pressure drops precipitately to a value substantially equal to atmospheric pressure, which is the pressure existing just outside the slice lip. Above the slice lip, as shown by the curve a—c—e, the pressure increases somewhat, as might be expected in view of the large volume loss in the stream delivered to the web-forming region, and the resultant decrease in flow velocity in this region. The velocity of flow within the web-forming region and in the flow passageway 132 below the slice is maintained at a value which desirably is substantially equal to the wire speed.

During operation, the trailing surface 133 of the slice plate 118 may be located approximately in line with the vertical center line 134 of the breast roll, and when this condition exists, the central axis of the cylindrical forming chamber is normally located some distance to the rear of the center line 134 of the breast roll. This arrangement, as shown in Figure 2, serves to position the entire web-forming region on a portion of the wire 11 which is at all times entirely supported upon the breast roll 13, and it also makes available the force of gravity to assist in removing the carrier fluid from the web-forming region of the wire, which is a very desirable feature in realizing the maximum benefit from the invention.

The ability of apparatus in accordance with the invention to effect satisfactory formation on a wire section which, at the time, is entirely supported on the breast roll, is likewise an important feature of the invention. Heretofore, most pressure-forming machines have been operated with the web-forming region extending so as to include, at least in part, an unsupported portion of the wire. This has resulted in undue stressing and wear of the wire, and it has required the use of quick-release slices and other mechanisms to prevent wire damage in the event stock flow is interrupted. It should be understood, however, that apparatus in accordance with the invention can be used in instances where the forming member is in part, or is even entirely unsupported in the web-forming region.

As previously stated, it is the function of the roll shell 55 to give adequate support to the forming wire 11 without, however, materially interfering with the flow through the wire. This usually involves the use of a shell structure which engages the wire in regions of restricted area approaching line or point contact. In the illustrated structure, the areas of contact between the shell 55 and the wire 11 are restricted to what are essentially, regions of line contact, and fluid flow through the wire is further facilitated by tapering the outer edges of the bar members 57 and by providing those edges with a series of closely-spaced peripheral slots 135, as shown in Figure 3.

In a representative embodiment of the invention having the general structural arrangement shown in Figures 1 to 3 and Figures 6 to 8, the breast roll 13 had a diameter of 30 inches. The cylindrical forming chamber had a diameter of 20 inches, and the forming roll had a diameter of 15 inches. Also, in this machine, which had a width in the transverse or cross-machine direction of 168 inches, the dimensions of the outlet from the forming roll chamber 79 (which dimensions substantially equal the dimensions of the web-forming region) was 6 inches by 168 inches, and the center of the forming chamber was located approximately 3 inches rearward (in the direction opposite to the movement of the formed web) of the center line 134 of the breast roll. The lower edge of the slice plate 118 was spaced about one inch ahead of the breast roll centerline, and the gap between the slice edge and the wire was about .040 inch. During operation of this machine at wire speeds within the range from about 1200 to 1500 feet per minute, the forming roll 81 was positioned with the surface thereof approximately .4 inch from the surface of the forming wire 11, as it was carried through the web forming region on the breast roll 13. Stock was delivered to the forming roll chamber 79 at a pressure within the range of from about 30–50 inches of water and the forming roll was operated to produce a peripheral speed over a range of from 500 to 2100 feet per minute.

The determination of the optimum operating conditions and the most desirable location of the forming roll with respect to the web-forming region and the other elements of the apparatus can be accomplished by theoretical analysis of the apparatus. However, such an analysis is a rather involved operation and it will generally be found most convenient to determine these conditions by experimentation. Fortunately, this is a relatively simple operation since the existence of the optimum operating conditions creates a readily observable change in the operation of the machine.

As previously stated, the primary objective of the pressure and velocity control provided in the practice of the present invention is the attainment of a flow velocity within the web-forming region which is substantially equal to the wire speed, while at the same time, providing increasing fluid pressure within the web-forming region in the direction of wire movement, this pressure being sufficient to effect proper fluid flow through the mat of fibers as it is formed on the wire. Independent control of the pressure and velocity relationships within the web-forming region is required, and it is further required that the independent control of the pressure and velocity within the web-forming region shall be effected independently of the movement of the wire or other web-forming member.

In attaining, in practical apparatus, operating conditions which at least approximate the stated objective, it has been found important that the structural arrangement and mode of operation of the apparatus shall be such that the fluid suspension of fibers moves through the flow control unit and is delivered to the web-forming region under conditions which can be substantially defined by the equations of potential flow. This involves the use of solid boundaries for the flow paths through the flow control unit, and particularly for the forming chamber, which approximate streamlines assumed to exist under conditions of potential flow. It follows that in the actual apparatus, there will be necessarily some departure from the exact conditions of potential flow, but that departure will not be of great magnitude. The use of a right, circular cylindrical forming roll, eccentrically or concentrically disposed within a right, cylindrical forming roll chamber, as above described, constitutes for stock and other low consistency fiber suspensions, a very satisfactory approximation of such streamline boundaries.

The curves P1, P2 and P3 of Figure 4 illustrate the pressure relationships existing under satisfactory operating conditions within a flow control unit, which embodies a cylindrical forming roll and a cylindrical forming roll chamber of the general type previously described. These curves are keyed to the flow conduit of the flow control unit 47 illustrated in Figure 2 by the numerals 2 to 7, each of which is enclosed in a circle and positioned along the axis of abscissas. For example, the pressure relationships in the conduit region marked 4 in Figure 2 is shown by the pressure ordinate over the abscissa marked 4.

The curves P1, P2 and P3 are representative of average operating conditions, and they illustrate rather clearly the observed fact that for a given consistency stock which is being used in the manufacture of a given weight paper, there exists an optimum pressure relationship within the web-forming region which can be obtained substantially independent of other variables, such as stock supply pressure. The portions of the curves which are labeled, respectively P1a, P2a and P3a are representative of the pressure relationships in the flow passageway above the slice plate, whereas the curved portions P1b, P2b and P3b, illustrate the pressure relationships in the flow passageway 132 between the lower surface of the slice and web-forming member.

The curves show that the first fibers to reach that member are under minimum hydraulic pressure. These fibers, as previously stated, have a velocity throughout the web-forming region which is substantially equal to, and in the same direction as, the velocity of the moving forming member. Thus, in the initial portion of the web-forming region in the illustrated apparatus, the portion indicated at 4 in Figure 2, the desired conditions, i. e. that the flow velocity should substantially equal the wire speed and that the hydraulic pressure in the flowing stream of liquid shall be at a minimum, are accomplished. The maintenance of these conditions effects the laying-down of the initial part of the web with a minimum of penetration of the forming member by the web fibers and with a minimum directional effect, due to the absence of relative movement of the wire and fibers as formation begins. However, once the mat begins to become established, it is desired that the hydraulic pressure available to effect fluid flow through the forming member shall increase as rapidly as possible in order to effect a maximum amount of fiber deposition and fluid drainage within the web-forming region. Also, as pointed out above in connection with Figure 5a, pressure relationships compatible with flow conditions existing under conditions of plastic flow are desirably provided in the region of the slice.

As will be hereinafter described, the apparatus is usually operated in such manner that the main stream of stock passing through the flow control unit, which stream is of generally rectangular cross-sectional outline, is divided into three divisions or layers. Each division constitutes, in effect, a portion of the main stream having the same width, transversely of the machine, as the main stream. The three divisions are thus disposed side-by-side in the direction of movement of the forming member. The central division is directed through the web-forming region into contact with the wire or other forming member; the upstream division is caused to flow backwardly along the wire or other forming member as that member moves into the web-forming region; and the third, or downstream division, is conducted away from the web-forming region and recirculated within the flow control unit.

It will be evident that this mode of operation will inherently result in the continuous carrying away from the web-forming region of the upstream and downstream boundary or surface layers of the main flowing stream of stock passing through the flow control unit. In other words, the boundary layers or the laminae which are in contact with the two, main, transverse defining surfaces of the flow conduit through the flow control unit, which layers are necessarily affected by frictional contact with the defining surfaces of the conduit through which they pass, are continuously removed from the web-forming region, with resultant important improvement in the hydraulic characteristics of the stream division reaching the web-forming region on the forming member.

During the practice of the invention, the attainment of flow conditions which are substantially defined by the potential flow theory involves the existence of flow conditions wherein the Reynolds number is above about 5,000, and the existence of fine-grain or fine-scale turbulence, within the flowing stream of fluid which is delivered to the web-forming region. This is an important aspect of the invention, since it assures the presence, within the flowing stream of fiber-bearing fluid reaching the web-forming region, of a very large number of small vortices of about the same dimensions as the individual suspended fibers, with resulting important improvement in the fiber distribution and the web formation.

The most important variables involved in the operation of flow control and web-forming mechanisms in accordance with the invention are the speed of the forming roll, the clearance between the surface of the forming roll and the wire or other web-defining element in the web-forming region, the pressure at which the fluid suspension is delivered to the forming roll chamber, and the relative proportions of the flow conduit within the forming roll chamber. Other variables of considerable importance in the operation of these web-forming mechanisms, especially when used in the manufacture of paper, are the consistency of the stock, or other fluid suspension of fibers, the width (in the direction of wire travel) of the web-forming region, and the roll surface. So long as the roll clearance and the relative dimensions of the flow passageways within the forming roll chamber are within the operating range, the speed of the forming roll is probably the most important of all the variables in the mechanism.

Flow velocities approximating wire speed with accompanying pressure relationships in accordance with the curves illustrated in Figure 4 are readily attained in the illustrated structure, assuming that the relative proportions of the flow conduit within the flow control unit are within operable limits, by proper adjustment of the position of the forming roll 81 relative to the forming wire 11, of the roll speed and of the clearance between the surface of the forming roll 81 and the wire 11. While any given set of adjustments is subject to change in response to change in the pressure at which the liquid material is supplied to the forming roll chamber, the attainment of pressure relationships, such as are illustrated in Figure 4, requires only a relatively small amount of experimentation. The roll speed can be initially tried, at a peripheral speed which is about equal to or somewhat less than the speed of the forming member, and the determination of the optimum setting for the other operational variables can usually be effected by inspection of the web. In troublesome cases, pressure taps can be used to establish conditions where the pressure increases rapidly in the direction of wire movement within the web-forming region, while, at the same time, maintaining the optimum velocity relationship as above described.

It is because of the observed fact that the maintenance of the most satisfactory operating conditions is dependent upon the maintenance of uniform pressure in the flowing stream of fluid-suspended fibrous material delivered to the forming roll chamber, that the apparatus includes pressure regulating means such as the automatically operable pressure regulating valve 39 and its associated by-pass 49. Variation in this pressure will not alter materially the shape of the pressure-velocity curves, other conditions remaining fixed, but will alter the actual pressures obtained. It would, for example, produce pressure changes within the web-forming region which would be illustrated by a vertical displacement of the curves of Figure 4. Similar changes in the velocity relationships would also occur, and variation in the weight of the web, and possibly in the character of the web which is being formed on the wire, or other forming member would follow. Hence, for a given operating speed under a given set of conditions, uniform supply pressure is quite important.

Because of the fact that web-forming apparatus in accordance with the invention is capable of adding, and normally does add, substantial amounts of energy to the flowing stream of fluid-suspended fibrous material which is delivered to the web-forming region, the pressure at which that material is delivered to the forming roll chamber can be substantially lower than the pressures involved in existing web-forming equipment. For example, in the manufacture of paper, the stock is normally delivered to the mechanism which directs the stock onto the web-forming region at a pressure which approximates the pressure that is required to produce a spouting velocity at the slice which is equal to the speed of the wire or other forming member. In papermaking apparatus using web-forming apparatus in accordance with the invention, however, stock can be delivered at a pressure which is materially below the pressure required to produce a spouting velocity at the slice equal to the wire speed. Usually a pressure equal to about one-half the normal operating pressure will give good results. The importance of this in making possible great increase in the speed of existing equipment without change in the stock delivering means is evident.

Also, the invention makes possible, and in some instances is best carried on by, the use of low consistency stock suspensions. To illustrate, tissue papers of the usual weights are presently manufactured from stock having a consistency within the range of from about .18% to .35%, and book papers of the usual weights are manufactured from stock having a consistency within the range of from about .5 to 1.0%. In apparatus in accordance with the invention, stock consistencies as low as .05% can be used, and in making tissue and book papers on a Fourdrinier machine at speeds within the range of from 500 to 3,000 feet per minute, the usual consistencies employed will be within the range of from .05% to .4%. The use of these low consistency fluid suspensions has important advantages in improved formation, greater ease of control, etc.

A substantial amount of the stock or other fiber-containing fluid material is continuously circulated within the forming roll chamber 79 during the operation of the apparatus, the amount thereof being determined to a large extent by the relative dimensions of the flow passageway through the flow control unit. Also, a small amount of fluid is caused to flow out of the web-forming region underneath the lower edge of the slice 118, as above described. This fluid should flow outwardly from the web-forming region at a velocity which is substantially equal to the wire speed. It serves the dual function of lubricating, and thereby preventing derangement of, the formed web as it passes beneath the slice, and of stabilizing the flow in the region of the slice by making possible the creation of a line of stagnation points across the upstream or leading surface 129 of the slice. The advantages of using a slice structure which provides a passageway, as at 132, of decreasing cross-sectional area in the region immediately ahead of the slice lip have been discussed above.

Also, in order to accomplish the most satisfactory possible web-formation and over-all stability of operation, it is desirable that a portion of the flowing stream of stock delivered to the web-forming region shall flow backwardly along the moving forming wire through the passageway 121 existing between the under surface of the apron plate lip 119 and the wire 11. When the relative proportions of the flow passageways in the apparatus are such that a stable, backwardly flowing stream of stock is produced in the region where the wire 11 moves into the web-forming region, transient instabilities within the flow conduit adjacent the web-forming region will be substantially eliminated. Moreover, this backwardly flowing stream of stock will have the effect of continuously removing and carrying away from the web-forming region the adjacent boundary layer of the stream of stock which flows through the flow control unit 47 into the web-forming region. At the same time, the boundary layer adjacent the surface of the forming roll 81 is removed from the web-forming region by recirculation through the flow conduit existing between the surface of the forming roll and the upper surface of the slice plate. As a result, during operation of the equipment, it is only the central portion of the flowing stream passing through the flow control unit in the direction of the web-forming region which is delivered to that region, the boundary layers being continuously diverted and removed from that region. The flow conditions in the stream reaching the web-forming region can thereby be caused to more nearly approximate potential flow conditions, and improved formation will be attained.

The amount of stock which is discharged in the backward direction through the passageway 121 may constitute a substantial proportion of the total stock delivered to the forming roll chamber 79. As pointed out in my said application Ser. No. 121,525, amounts up to 40 or even 50 per cent of the total flow have been observed to have been required under certain machine conditions, although it is the stable character of the flow rather than the amount which is the critical factor in obtaining the desired operating conditions.

When the backward flow of stock is controlled by moving the lip 119 of the apron plate 115, a trial and error procedure will usually be found convenient for determining the optimum location of the apron plate lip. This procedure is particularly facilitated by virtue of the fact that the existence of stable flow conditions in the backwardly flowing stream is accompanied by corresponding stable flow conditions in the adjacent portion of the forming roll chamber. Thus, a pressure tap, or series of taps, may be provided in this region as, for example, as shown at 136 in Figure 2, and the optimum location of the lip can be determined by reference to the pressure conditions existing in this region. The proper position of the lip 119 will be shown by the absence of substantial pressure variations in the region with which the pressure tap connects. When a new machine is being first put into operation, some corresponding adjustment of the speed of the forming roll, or even the roll position, may be required following adjustment of the lip, but this is usually of a minor nature.

The proportion of the flowing stream of stock delivered to the web-forming region which is caused to flow backwardly along the wire or other web-forming means as it moves into the web-forming region during the operation of the apparatus affects the pressure-velocity relationships existing within the web-forming region. The curves P1 to P3 in Figure 4 illustrate typical conditions for satisfactory operation of a papermaking machine used in the manufacture of a light weight paper as, for example, a tissue having an un-creped basis weight of from 4 to 9 pounds for 480 sheets 24 × 36 inches from stock having a consistency of .1%. Also, these curves are representative of the pressure relationships existing within the web-forming region under conditions where from 5 up to about 20 per cent of the total amount of stock delivered to the web-forming region is caused to flow backwardly along the ascending wire through the passageway 121.

In the manufacture of other types of papers using differing types of stock, different speeds of operation, etc., other relationships may give better results. For example, the curves P1, P2 and P3 shown in Figure 5 are illustrative of conditions wherein stock of a somewhat greater consistency is used in the manufacture of paper of a considerably heavier basis weight. Under the particular conditions of which the curves of Figure 5 are representative, the back flow may reach a percentage as high as from 30 to 40 per cent of the total flow into the web-forming region. It will be noticed that a somewhat higher pressure tends to exist throughout the web-forming region, and also that there may be certain minor variations in the region where the forming roll and the web-forming surface are nearest to each other. This is characteristic of operation involving higher percentages of back flow.

From theoretical considerations, flow control apparatus utilizing solid boundaries having surfaces which approximate the boundaries of streamlines of potential flow will operate at maximum efficiency and with a minimum variance from conditions of potential flow when the back flow is just sufficient to remove the boundary layer. However, the over-all stability of operation of the apparatus is improved to such an extent by the provision of a larger amount of back flow along the web-forming member that flow in such larger amounts is recommended. Usually, provision for back flow in an amount up to about 20 per cent of the total flow into the web-forming region will be satisfactory in connection with papermaking apparatus such as has been described above.

The relative dimensions and contour of the forming roll and the wire, or other web-forming member, determine to a very substantial degree the permissible dimensional limits of the web-forming region. In general, the larger the diameter of the forming roll and the more nearly the contour of the web-forming member approaches the contour of the web-forming roll, the larger the permissive web-forming region. When the forming roll comprises an imperforate, smooth-surfaced, cylindrical member and the web-forming region constitutes an arcuate shaped portion of a forming wire which is supported on an open type breast roll, it will generally be found advisable to use a forming roll which is at least one-half the diameter of the breast roll. In the manufacture of paper of the usual types on Fourdrinier machines, at speeds within the range of from 1,000 to 3,000 feet per minute and by the use of stock at consistencies of less than .4%, it will generally be found advisable, in the practice of the present invention, to utilize a forming region which is from about 2½ to 6½ inches in width, measured in the direction of wire travel.

The effect of the forming roll in controlling and determining the pressure-velocity relationships within the web-forming region is dependent for a roll of given size and surface characteristics on the two primary factors of the spacing or clearance between the surface of the forming roll and the web-forming member and the speed of rotation of the forming roll, although to some extent these factors are interrelated, since increased roll speeds permit greater clearances and vice versa. Also, the character of the roll surface has its effect, a roll surface which is roughened to some extent tending to increase the effect produced by the roll. In the manufacture of tissue and book papers on a Fourdrinier machine, by the use of stock suspensions wherein the concentration of fiber is within the usual range (i. e. not over about .4%), and wherein the paper is being manufactured at speeds within the range of from 1,000 to 3,000 feet per minute, it has been found that particularly satisfactory operation will result if the roll to wire clearance is maintained within the range of from about .25 to .75 inches. Under the same conditions, operation of the forming roll at peripheral speeds within the range of from about 500 to 3,500 feet per minute can be expected to give satisfactory results.

In order to attain the fullest advantage of the invention, as previously described, the first fibers to be laid-down on the wire or other forming member should be brought into contact with the forming member under such conditions that there is substantially no velocity difference between the two, and that, at the same time, the fluid pressure should be kept very low, in order that these fibers will not be pressed into the wire or other forming surface. It should be understood, however, that this particular pressure-velocity relationship is not essential in the manufacture of felted fibrous sheet products in accordance with the invention. The provision of a flow control means which includes a forming roll and a forming roll chamber, as herein disclosed, makes possible a wide range of pressure and velocity conditions within the web-forming region, which conditions are maintained completely independently of the movement of the forming wire or its support. For best results in the manufacture of paper, an increase in pressure and a decrease in velocity in the direction of flow appears most advantageous, but pressure and velocity gradients of other types and relationship can be produced and will give results which are much improved over the prior arrangements which include no such control means.

It is also desirable that the direction of approach of the flowing stream of stock to the web-forming region, under conditions as above stated, should be as close to the direction of movement of the web-forming member as is possible. This condition is not, however, of nearly as great importance as the conditions of roll speed, clearance as related to roll speed, supply pressure, and the relative proportions of the flow conduit within the forming roll chamber, as above discussed, although it does have a substantial effect on web pickup. In other words, if the web can be formed without forcing the fibers into the wire or other web-forming element, pickup at the couch roll is very materially improved. The angle of approach also has some effect on the cross-directional strength of the sheet, best results being obtained when the stock enters the web-forming region as nearly parallel to the web-forming member as is possible.

As previously pointed out, the relative dimensions of the flow conduit within the forming roll chamber (which dimensions determine in large part the amount of the fluid suspension which is re-circulated within the forming roll chamber 79) constitute one of the more important variables in the apparatus. Not only does this re-circulation of fluid within the forming roll chamber remove from the web-forming region the boundary layer adjacent the forming roll, but in addition it appears to exert an important influence on the maintaining of flow conditions which approximate the conditions of potential flow within the forming roll chamber. It is important, therefore, in the operation of the apparatus that a flow passageway of substantial dimensions shall exist between the upper surface of the slice plate, or other means defining the downstream edge of the forming roll chamber, and the adjacent surface of the forming roll.

To summarize the foregoing discussion of the several variables which determine the operation of apparatus in accordance with the invention, with particular regard for the manufacture of paper on a Fourdrinier machine, it will generally be found advisable in the manufacture on Fourdrinier machines of tissue and book paper having a basis weight up to perhaps 60 pounds for 480 sheets 24x36 inches, to utilize stock having a consistency within the range of from about .05% to .4%, this range applying to speeds of operation of from 500 to 3,000 feet per minute. It will be noted that this consistency is somewhat lower than that usually employed in the operation of Fourdrinier papermaking machines, especially pressure inlet machines.

Under these same conditions, it will generally be found satisfactory to supply the stock to the flow control unit at a pressure within the range of from about 15 to 100 inches of water. This pressure is less than the pressure necessary to produce a spouting velocity equal to the higher speeds expected to be attained and is an indication of the rather substantial degree of control which is realized over the flowing stream delivered to the web-forming region.

Also, in the manufacture of paper under these stated conditions, it will be found advisable to use a forming area which has a minimum width within the range of from about 2½ to 6½ inches in the direction of movement of the wire. This dimensional range is subject to some variation, but the stated values constitute a good average minimum range for usual operations.

When operating under the above stated conditions, control of the velocity and pressure relationships within the web-forming region will be accomplished by suitable variation and correlation of the speeds of the forming roll and the web-forming member, the clearance between the forming roll and the wire or other forming member, the character of the surface of the forming roll, and the relative dimensions of the forming roll and the forming roll chamber as related to the dimensions and contour of the wire, its support and the web-forming region. The speed of the forming roll will normally be regulated to produce a peripheral speed which is of the same general order of magnitude as the speed of the forming wire, that is, for wire speeds within the range of from 500 to 3,000 feet per minute, roll speeds sufficient to produce peripheral speeds within the general range of from 500 to perhaps 3,500 feet per minute will be satisfactory. The greater the clearance between the forming roll and the forming member, the higher the roll speed, as above noted, and under some conditions the peripheral speed of the forming roll may exceed the wire speed. The effect of the forming roll may be rather generally described as the establishing of a forced vortex which is eccentric with respect to the axis of the forming roll chamber.

The minimum clearance between the forming roll and the forming wire will usually be within the range of from about .1 to .3 inch, although it may be greater. The surface of the roll will usually be smooth although, as previously pointed out, it can be somewhat roughened with increased effect.

As to the relative dimensions and proportions of the forming roll as related to the dimensions and contour of the forming wire, its support and the web-forming region chamber, the principles governing these relationships have been discussed in the foregoing. Generally stated, these dimensions and proportions should assure an adequate amount of recirculation of the fluid suspension within the forming roll chamber, together with an adequate amount of backflow if backflow is to be used. For papermaking operations, under the conditions above stated, it will usually be found desirable to so proportion and to so position the forming roll and slice that an amount of stock equal to from 25 to 50 per cent of the amount delivered to the web-forming region is recirculated. At the same time, provision should be made for sufficient backflow along the forming wire, as it moves into the web-forming region, to produce stable flow conditions. Usually this involves backflow in an amount equal to from about 5 to 20% of the flow delivered to the web-forming region, although a substantially larger amount may be advantageous under certain operating conditions, as pointed out in my prior application, S. N. 121,525.

*Example No. 1*

To illustrate by way of specific examples, in the manufacture of a lightweight tissue paper sheet (having a basis weight of 6 pounds for 480 sheets 24x36 inches) on a Fourdrinier papermaking machine having the general structural arrangement shown in Figure 2, the breast roll 13 had a diameter of 24 inches, the forming roll 81 a diameter of 12 inches, the forming chamber 79 a diameter of 16 inches.

The forming roll 81 was so positioned within the chamber 81 that the minimum spacing, measured in a radial direction, between the forming roll surface and the wire 11 in the web-forming region equalled .580 inch, the minimum spacing between the forming roll 81 and the lip 119 of the apron plate 115 equalled .766 inch, measured in a radial direction, and the minimum width of the flow conduit between the upper surface of the slice plate 118 and the surface of the forming roll equalled .245 inch, this dimension being also measured in a radial direction. In this machine the passageway 121 between the under surface of the apron plate 115, and the wire 11 had a minimum width of .011 inch, and the web-forming region had an approximate length peripherally of the breast roll of 3.50 inches.

When operating this machine with a wire speed of 1250 feet per minute, the best possible formation conditions were obtained when the stock was delivered to the flow control unit at a head of 24 inches (of water) and a consistency of approximately .1 per cent and when the forming roll (which was smooth surfaced) was operated at a speed sufficient to produce a peripheral speed of 1800 feet per minute. During operation, the leading surface of the slice plate 118, the surface 129, was located in substantial coincidence with the vertical center line 134 of the breast roll, and the slice lip was spaced a distance of .070 inch from the wire 11.

*Example No. 2*

In the manufacture of a somewhat heavier sheet having a basis weight of 10 pounds for 480 sheets 24 x 36 inches, on the same machine described in connection with Example No. 1, the following dimensions existed: minimum spacing between the surface of the forming roll 81 and the wire 11 in the web-forming region .940 inch as measured in a radial direction; minimum spacing between the surface of the forming roll 81 and the lip 119 of the apron plate 1.25 inches, measured in a radial direction; minimum width of the flow conduit existing between the upper surface of the slice plate 118 and the surface of the forming roll .375 inch, also measured in a radial direction; minimum width of the passageway 121 between the apron plate 115 and the wire .300 inch;

and length of web-forming region measured along the periphery of breast roll 4.75 inches. When operating this machine at a wire speed of 1500 feet per minute, the best possible formation was obtained when the stock was delivered to the flow control unit at a head of 51 inches of water, and a stock consistency of .10%, a forming roll speed which produced a peripheral speed at the forming roll surface of 2000 feet per minute. The leading surface 129 of the slice plate 118 was disposed one inch upstream of the vertical center line 134 of the breast roll 13, and slice lip to wire clearance equalled .044 inch.

Under certain conditions of operation, it has been found that improved web formation, or increased speed of operation, or both, can be accomplished by the use of an open-surfaced breast roll which is provided with pressure or suction box units located within the roll shell. The web-forming mechanism of a Fourdrinier machine embodying such units is shown particularly in Figures 9 and 10. The apparatus illustrated in these figures, except for the structure of the breast roll 137, and especially the addition to the breast roll structure of pressure and suction box units 138 and 139, is essentially similar to the web-forming mechanism illustrated in Figure 2, which has been described in the foregoing, and corresponding parts of the mechanism shown in Figure 2 and in Figure 9 and bear similar numbers.

Figure 9:
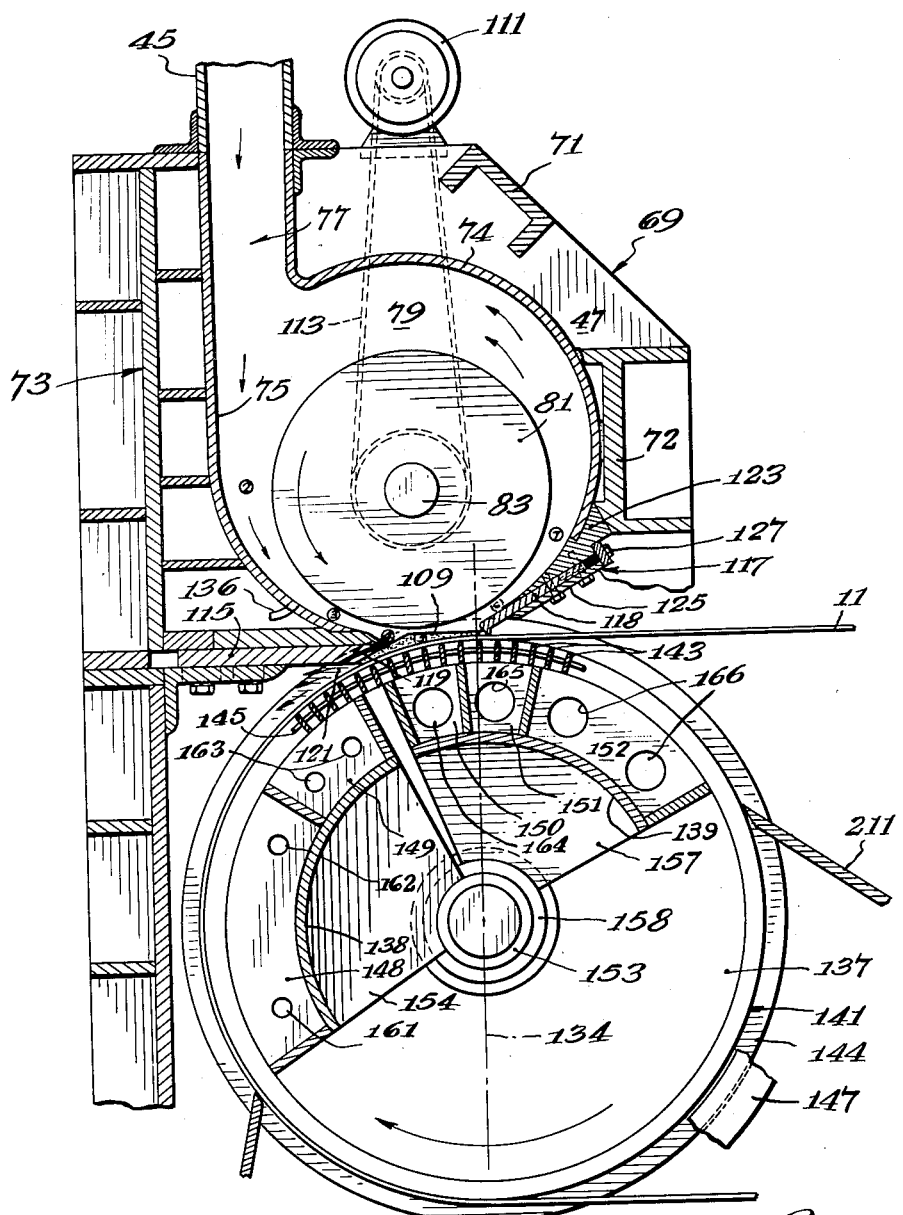
Figure 9 is an enlarged, vertical, cross-sectional view showing the features of a web forming mechanism, similar to the mechanism illustrated in Figure 2, but wherein the breast roll is provided with pressure and suction box units and certain related equipment.
Figure 10:
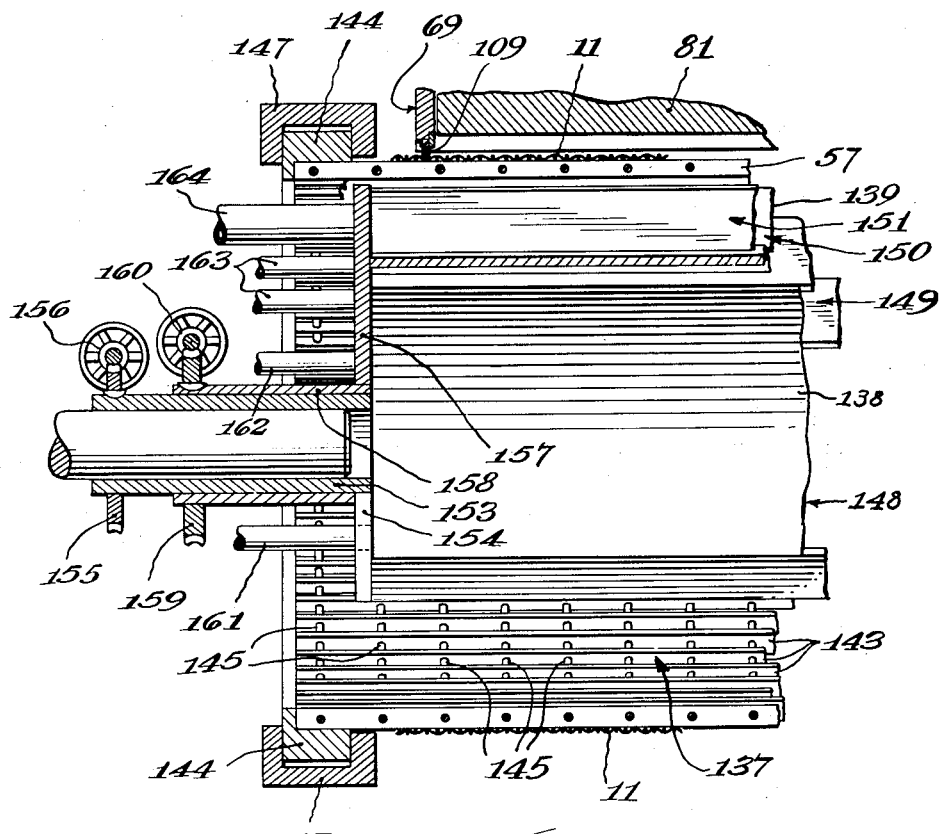
Figure 10 is a sectional view illustrating, in particular, certain details of the pressure and suction box units and related equipment constituting a part of the breast roll structure illustrated in Figure 9.

The breast roll 137 of the Figure 9 structure includes a reticulated outer shell 141, which may comprise a series of spaced bar members 143 supported on annular headers 144 and interconnected by tie members 145, similar to the breast roll 13. However, in the apparatus illustrated in Figures 9 and 10, the annular headers 144 are in turn supported upon suitable annular bearing supports 147, at least one of which may include a roll drive (not shown). The breast roll 137 should be adjustably supported, as described above in connection with the breast roll 13.

The pressure and suction box units 138 and 139 include a series of separate, elongated, segmental boxes or compartments, which are arcuate in form and which are positioned in contact with the inner surface of the roll shell 141. The unit 138 includes two separate compartments 148 and 149, and the other unit 139 is divided to provide three compartments 150, 151 and 152.

During operation of the apparatus, it may be found advisable to effect adjustment of the relative position of the pressure or suction box units 138 and 139 along the inner periphery of the breast roll shell 141. In the illustrated apparatus, the means for this purpose includes adjustable mountings for each of the units 138 and 139. Specifically, the defining walls of the compartments 148 and 149 which make up the lower unit 138, are rigidly attached to, and supported upon, a pair of axially aligned, hollow stub shafts 153 by means of a pair of segmental plate sections 154, one of which is welded or otherwise attached to each shaft 153. A gear 155 (Fig. 10) is keyed to the outer end of one of the stub shafts 153, and the apparatus includes a worm and hand-wheel unit 156 which coacts with the gear 155 to effect rotation of the entire unit 138, internally of the breast roll shell 141, and to lock the unit in a selected position. Suitable bearing supports, not shown in detail are provided for the stub shafts 153.

The other unit 139 is similarly mounted by means of segmental plate sections 157, upon a pair of short, hollow shaft sections 158, which are journalled upon the stub shafts 153, as illustrated. A gear 159 (Fig. 10), similar to the gear 155 is keyed to one of the short shaft sections 158, and a worm and hand wheel unit 160 coacts therewith to effect movement of the suction box unit 139 relative to the inner surface of the breast roll shell. Connections are made to the interior of each of the compartments in the pressure or suction roll sections by pipe or conduits, as indicated at 161, 162, 163, 164, 165 and 166. These conduits may include a flexible section in order that they will not interfere with the movement or adjustment of the units 138 and 139.

The provision of the two pressure or suction units 138 and 139, which are of such dimensions that they encompass not only the web-forming region on the breast roll 137, but also substantial areas ahead of and subsequent to the web-forming region, the division of the units into a plurality of separate compartments which can be maintained at differing selected pressure or vacuum conditions, and the provision of means for adjusting the position of the units all combine to produce a breast roll structure of very great flexibility. Of particular importance, the arrangement makes possible operation of the apparatus with differing and individually controllable pressures in portions of the web-forming region and in regions ahead of or subsequent to the web-forming region. Also, it may be found desirable under certain conditions to create an outward flow of water or other fluid through the breast roll and the portion of the wire supported thereon, which is ahead of the web-forming region, i. e. in the region opposite the compartments 148 and 149. The described arrangement is particularly adapted for accomplishing this type of operation.

In order to even-out the flow into or out of the pressure or suction compartments 148 to 152 provided in the units 138 and 139, and to minimize flow disturbances at the surface of the wire 11, the bar members 143 which define the shell of the breast roll are desirably tapered at their outer edges and may be provided with a series of closely spaced, peripherally extending slots, similar to the slots 135 provided in the bars 57 as shown in Figure 3. It will generally be found advantageous to provide the edge portions of the defining walls of the pressure or suction box units 138 and 139 which engage the inner surface of the roll shell 141 with bearing seals, as is the usual practice in suction roll constructions. Such seals are well known, and will not be described here.

Figure 11:
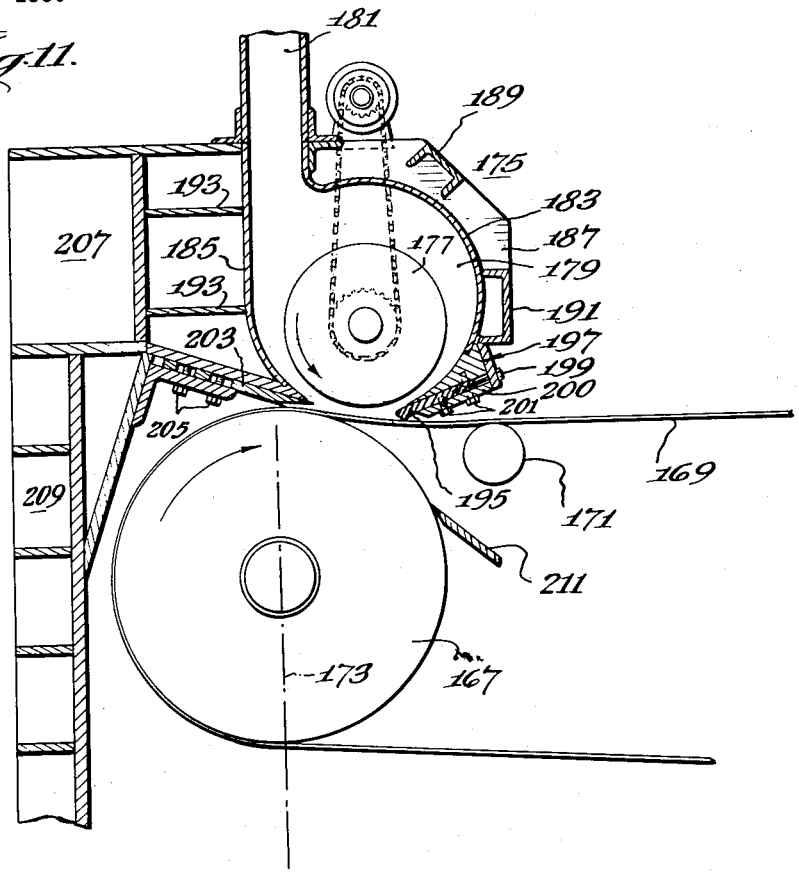
Figure 11 is a sectional view, also generally similar to Figure 2, illustrating the application of apparatus in accordance with the invention to a papermaking machine utilizing a solid breast roll.

As previously suggested, the principles of the present invention are applicable to papermaking machines utilizing solid type breast rolls, and certain features of a machine of this type are illustrated in Figure 11, which is a view similar to Figure 2. In Figure 11, a solid type breast roll is indicated at 167. The Fourdrinier type wire 169 is trained about this roll and is supported outward of the breast roll 167 by a series of table rolls, one of which is illustrated at 171. Mounted above and somewhat forward of the vertical center line 173 of the breast roll 167 there is a flow control unit or stock delivery mechanism 175 which includes a forming roll 177 arranged to be positioned in close proximity to the wire 169 and means defining the walls of a cylindrically-shaped forming roll chamber 179 within which the forming roll 177 revolves.

Stock is delivered to one side of the forming roll chamber 179 as in the previously described embodiment, via a conduit 181 having a rectangular cross section and a width transverse of the machine which is equal to the transverse width of the web-forming region on the wire 169. The conduit 181 will normally connect with the outflow end of a flow spreader which in turn is connected to a stock delivery system, capable of delivering stock at the desired consistency under uniform pressure, as described in the foregoing.

The cylindrical forming roll chamber 179, which extends completely across the machine, is defined by suitable plate sections 183 and 185 which are attached to vertical side plates 187 connected together by suitable reinforcing and strengthening members as illustrated at 189, 191 and 193. A slice plate 195, which may be similar to the slice plate 118 is supported at the downstream side of the forming chamber 179 by means of suitable structural elements 197 as illustrated, and a series of screw adjusting members 199 are provided at spaced intervals along the slice for adjusting the relative position of that member. Also, similar to the previously described structure, a clamp plate 200 and spaced screw fastenings 201 are provided for locking the slice plate 195 in position. The other edge of the stock outlet opening leading from the forming roll chamber 179 to the web-forming region on the wire 169 is defined by an adjustable apron plate 203 which may be moved toward or away from the slice plate 195 by loosening the bolts shown at 205. Other portions of the machine frame which support and position the defining elements of the forming roll chamber 179, the apron plate 203 and the remainder of the structure are shown at 207 and 209.

In view of the fact that the web is formed in apparatus of this type on an unsupported section of the wire 169 and the further fact that the stock is delivered to the web-forming region at substantial pressure, the wire will yield and bow to some extent during the operation of the machine. For this reason it is even more important than in the apparatus illustrated in Figures 2 and 9, that means be provided for effecting controlled relative movement between the wire support and the flow control unit which serves as the stock delivery means. This means, as in the other structure, may constitute an automatically operable support mechanism of a hydraulic or other type, and since such mechanisms are known in the art, a detailed description of the mechanism will not be given. The adjustable support for the breast roll 167 should provide for both fore and aft movement and for vertical adjustment of the breast roll position, in order to assure, during the operation of the machine, the most advantageous positioning of the forming wire with reference to the outlet of the forming roll chamber 179, which outlet substantially defines the dimensions of the web-forming region. A roll doctor 211, as in the other exemplary embodiments of the invention, aids in directing the flow of the white water away from the roll surface.

The operation of this apparatus is essentially similar to the operation of the open breast roll mechanisms previously described, and the various limits which have been set forth with reference to the stock consistency, the pressure at which the stock is supplied to the flow-control unit, the relative speed of the forming roll and the forming wire, the clearance between the forming roll surface and the wire, the relative dimensions of the forming roll and the forming roll chamber as related to the dimensions and contour of the forming member and the web-forming region, which dimensions determine and control the amount of back flow, the amount of recirculation within the forming chamber, etc., all apply to this type operation. Due to the need for somewhat more critical adjustment of the position of the forming wire relative to the outlet of the flow control unit, the operation of machines using a solid breast roll is to that extent somewhat more critical than the operation of open breast roll or suction breast roll machines. However, most of the more important advantages of the invention, including improved formation, substantially increased speeds of operation and the possibility of using lower stock consistencies, are also obtainable in this type of apparatus.

The use of a flow control unit or stock delivery means which employs a forming roll and a forming roll chamber in accordance with the invention, is not restricted to pressure-forming and inlet type machines, although the full advantages of the invention will not be realized in papermaking machinery wherein the stock is delivered to the web-forming region with a total energy content corresponding to pressures less than about 15 inches of water. Since energy levels of this and considerably greater magnitude are obtainable and are commonly used in headbox type papermaking machines, the invention may be advantageously employed in such machines.

Figure 12:
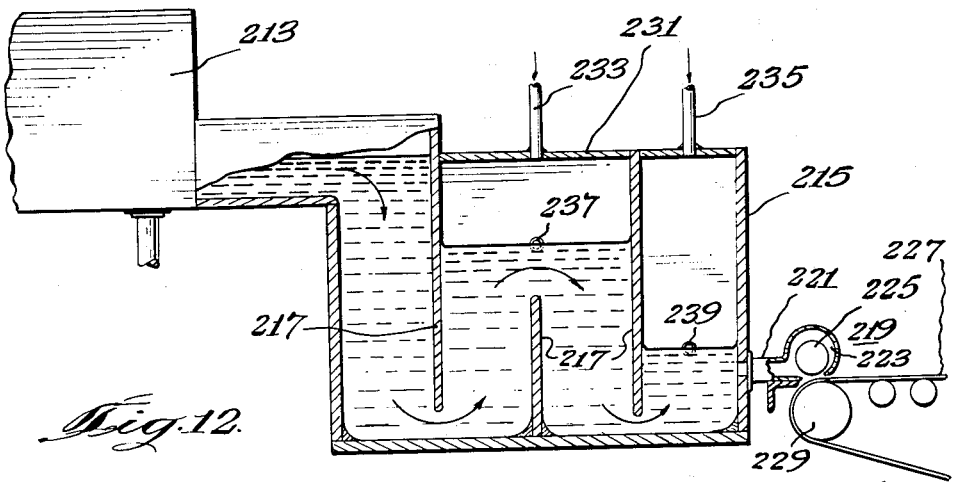
Figure 12 is a schematic view, partially in vertical section and partially in side elevation, of a headbox type machine embodying web-forming means in accordance with the invention.

An example of a headbox-type machine embodying formation control means in accordance with the invention is shown in the schematic view (Fig. 12). In that view a source of stock which may constitute a mixing trough connected to receive the discharge from a series of Bird screens is illustrated at 213. This trough 213 discharges into one end of a headbox 215 which is provided with a plurality of spaced, flow-control baffles 217 in the usual manner, and the headbox is arranged to discharge into a flow control unit 219 which embodies various of the features of the invention. More particularly, the flow control unit 219 includes means defining the walls of a flow conduit 221 which terminates in a cylindrical forming roll chamber 223 and a rotatable forming roll 225 is disposed in that chamber with its axis eccentrically disposed relative to the axis of the chamber, similar to the previously described structures. The flow control unit 219 is arranged to direct a flowing stream of stock into a web-forming region through which a forming wire 227 is moved. The wire 227 may be supported on an open breast roll, as indicated at 229, or it may be otherwise supported and moved through the web-forming region. The flow control unit 219 includes slice and apron plates (not shown in detail), and it is intended that the apparatus shall be operated in substantially the same manner as described in conjunction with the flow control units shown in Figures 2 and 9.

A particular advantage results from the use of flow control apparatus in accordance with the invention in connection with Fourdrinier and similar type headbox machines, for the reason that the pressure at which the stock is delivered to the flow control unit can be substantially less than the pressure which is required to produce a spouting velocity equal to the wire speed, the normal pressure at which such machines are operated. This makes possible considerable increase in the operating speed of the machine without any increase in the pressure at which the stock is delivered from the headbox, in addition to the other important advantages resulting from the use of the invention.

If desired, the headbox 215 may be of the closed or pressurized type. For example, as shown in Figure 12, a portion of all of the top of the headbox may be closed, as shown at 231, and air under pressure may be admitted thereinto, as by the inlet pipes 233 and 235, for the purpose of reducing the level of the stock contained in the headbox. Different sections of the headbox may be maintained at different levels or all may be maintained at the same level. Normally, in pressurized headboxes, the liquid level and pressure are maintained at selected values by supplying a slight excess of air and permitting a constant drain of air or stock, or both from the headbox section or sections by way of a pressure and level regulating opening, such as illustrated at 237 and 239.

It will be noted that the stock is admitted to the forming roll chamber 223 adjacent the bottom thereof. In general, stock can be admitted to the forming roll chamber of flow control units in apparatus in accordance with the invention at any convenient point.

In the foregoing, I have disclosed certain new and heretofore unknown principles with reference to the formation of fibrous webs by the use of fluid suspensions of fibrous materials. Of particular importance, it has been shown that improved web formation can be accomplished by the use of mechanism which effects continuous control of the pressure and velocity relationships existing in the web-forming region independently of each other and independently of the movement of the web-forming member or its support.

The specific examples of apparatus in accordance with the invention which are disclosed herein have particular application to the manufacture of paper, and consist basically of a stock delivery mechanism which includes a forming roll, adapted to be disposed in close proximity to the web-forming region, and a forming roll chamber, which may constitute a cylindrical chamber of somewhat larger diameter than the forming roll, wherein the forming roll is positioned.

The invention is not limited, however, to use in connection with the specific examples. To further illustrate, the principles and web-forming procedures herein disclosed can be adapted for use in web-forming apparatus which employs forming-table units. Also, it can be adapted for use with large diameter, open-type forming cylinders of such dimensions that the forming member is entirely supported thereon, and the wire as such is not required.

Also, there have been set forth at some length various of the critical factors and characteristics of flow control and web-forming apparatus in accordance with the invention, and especially the principles determining the relative speed of rotation of the forming roll and the wire or between the surface of the forming roll and the wire or other forming member in the web-forming region, the pressure and consistency at which the fluid suspension is delivered to the forming chamber, the relative proportions of the flow conduit within the forming roll chamber, the recirculation of the fluid suspension within the forming chamber and the provisions of means whereby a portion of the stock delivered to the web-forming region is caused to flow backwardly along the wire as it moves into that region.

As previously noted, the invention makes possible substantially improved formation in the web which is laid down on the fluid-permeable web-forming member. As applied to papermaking, it permits the operation of papermaking machines at higher speeds and the use of substantially lower stock consistencies. Of particular and basic importance, the invention provides for the independent control of the pressure and velocity relationships in the region where the control of those relationships is of greatest importance, i. e., in the web-forming region.

The formation control principles of the invention are applicable quite generally to various types of web-formation operations wherein a felted fibrous web is formed by use of a fluid suspension of fibrous materials, and to various kinds of fibrous materials. Thus, the principles of the invention are applicable to the formation of fibrous webs by the use of gaseous suspensions of fiber. In such instances, it will usually be found most advantageous to support the wire or other web-forming member as a flat surface and to direct the flow of suspended fiber through a flat section of the forming member.

Various of the features of the invention believed to be new are set forth in the accompanying claims.

I claim:

1. In the manufacture of continuous fibrous webs, under pressure-forming conditions, by the use of a confined flowing stream of a fluid suspension of fibrous material which is of generally rectangular cross sectional outline, having a web-forming portion and at least one other portion which forms a boundary layer of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member as said member passes through the web-forming region, the improvement which consists in selectively increasing the fluid pressure in the web-forming portion of the flowing stream in the web-forming region by the controlled conversion of energy within said flowing stream to thereby effect a predetermined distribution of fluid pressure within the web-forming portion of said flowing stream in said web-forming region, and conducting away from said web-forming region a portion of said flowing stream which is spaced generally vertically from said forming member and which forms one of the boundary layers of said flowing stream.

2. In the manufacture of continuous fibrous webs, under pressure-forming conditions, by the use of a confined flowing stream of a fluid suspension of fibrous material which is of generally rectangular cross sectional outline, having a web-forming portion and at least one other portion which forms a boundary layer of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member as said member passes through the web-forming region, the improvement which consists in selectively increasing the fluid pressure in the web-forming portion of the flowing stream in the web-forming region by the controlled conversion of energy within said flowing stream to thereby effect a predetermined distribution of fluid pressure within the web-forming portion of said flowing stream in said web-forming region, and conducting away from said web-forming region a portion of said flowing stream which is spaced generally vertically from said forming member and which forms one of the boundary layers of said flowing stream under conditions such that said removed portion is recirculated into the flowing stream delivered to said web-forming region.

3. In the manufacture of continuous fibrous webs, under pressure-forming conditions, by the use of a confined flowing stream of a fluid suspension of fibrous material which is of generally rectangular cross sectional outline, having a web-forming portion and at least one other portion which forms a boundary layer of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member as said member passes through the web-forming region, the improvement which consists in selectively increasing the fluid pressure in the web-forming portion of the flowing stream in the web-forming region by the controlled conversion of energy within said flowing stream to thereby establish a predetermined increasing fluid pressure distribution within the web-forming portion of said flowing stream in said web-forming region in the direction of movement of said forming member, and conducting away from said web-forming region a portion of said flowing stream which is spaced generally vertically from said forming member and which forms one of the boundary layers of said flowing stream.

4. In the manufacture of continuous fibrous webs, under pressure-forming conditions, by the use of a confined flowing stream of a fluid suspension of fibrous material which is of generally rectangular cross sectional outline, having a web-forming portion and other portions which form boundary layers of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member as said member passes through the web-forming region, the improvement which consists in selectively increasing the fluid pressure in the web-forming portion of the flowing stream in the web-forming region by the controlled conversion of energy within said flowing stream to thereby effect a predetermined distribution of fluid pressure within the web-forming portion of said flowing stream in said web-forming region, and conducting away from said web-forming region said other portions which form boundary layers of said flowing stream, one of said other portions being removed at the upstream end of said web-forming region and caused to flow backwardly along said forming member and another of said other portions being removed adjacent the downstream end of said web-forming region, and caused to be recirculated into the flowing stream delivered to said web-forming region.

5. In the manufacture of continuous fibrous webs, under pressure-forming conditions, by the use of a confined flowing stream of a fluid suspension of fibrous material which is of generally rectangular cross sectional outline, having a web-forming portion and other portions which form boundary layers of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member as said member passes through the web-forming region, the improvement which consists in selectively increasing the fluid pressure in the web-forming portion of the flowing stream in the web-forming region by the controlled conversion of energy within said flowing stream to thereby establish a predetermined increasing fluid pressure distribution within the web-forming portion of said flowing stream in said web-forming region in the direction of movement of said forming member, and conducting away from said web-forming region said other portions which form boundary layers of said flowing stream one of said other portions being removed at the upstream end of said web-forming region and caused to flow backwardly along said forming member and another of said other portions being removed adjacent the downstream end of said web-forming region and caused to be recirculated into the flowing stream delivered to said web-forming region.

6. In the manufacture of continuous fibrous webs, under pressure-forming conditions, by the use of a confined flowing stream of a fluid suspension of fibrous material which is of generally rectangular cross sectional outline, having a web-forming portion and at least one other portion which forms a boundary layer of said flowing stream, said web-forming portion being caused to flow into contact with a moving, fluid-permeable forming member in a web-forming region in such manner that the longitudinal axes of said web-forming portion extends in a direction generally parallel to the direction of movement of said forming member as said member passes through the web-forming region, the improvement which consists in selectively increasing the fluid pressure in the web-forming portion of the flowing stream in the web-forming region by the controlled addition of energy within said flowing stream to thereby establish a predetermined increasing fluid pressure distribution within the web-forming portion of said flowing stream in said web-forming region in the direction of movement of said forming member, and conducting away from said web-forming region a portion of said flowing stream which is spaced generally vertically from said forming member and which forms one of the boundary layers of said flowing stream.

7. In the manufacture of continuous fibrous webs, under pressure-forming conditions, by the use of a confined flowing stream of a fluid suspension of fibrous material which is of generally rectangular cross sectional outline, having a web-forming portion and other portions which form boundary layers of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member, as said member passes through said web-forming region, the improvement which comprises introducing the flowing stream of fluid into said web forming region at a predetermined velocity and selectively increasing the fluid pressure in the web-forming portion of the flowing stream in the web-forming region by the controlled addition of energy within said flowing stream to thereby effect a predetermined increasing fluid pressure distribution within the web-forming portion of said flowing stream in said web-forming region in the direction of movement of said forming member, said controlled addition of energy being such as not to materially affect the velocity of the web-forming portion of said flowing stream in the direction of movement of said forming member within said web-forming region, and conducting away from said web-forming region said other portions which form boundary layers of said flowing stream, one of said other portions being removed at the upstream end of said web-forming region and caused to flow backwardly along said forming member and another of said other portions being removed adjacent the downstream end of said web-forming region, and caused to be recirculated into the flowing stream delivered to said web-forming region.

8. In the manufacture of continuous fibrous webs, under pressure-forming conditions, by the use of a confined flowing stream of a fluid suspension of fibrous material which is of generally rectangular cross sectional outline, having a web-forming portion and other portions which form boundary layers of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member, as said member passes thrugh said web-forming region, the improvement which comprises delivering the flowing stream of fluid to said web-forming region in a condition of fine scale turbulence and selectively increasing the fluid pressure in the web-forming portion of the flowing stream in the web-forming region by the controlled addition of energy within said flowing stream to thereby establish a predetermined increasing fluid pressure distribution within the web-forming portion of said flowing stream in said web-forming region in the direction of movement of said forming member, and conducting away from said web-forming region said other portions which form boundary layers of said flowing stream, one of said other portions being removed at the upstream end of said web-forming region and caused to flow backwardly along said forming member and another of said other portions being removed adjacent the downstream end of said web-forming region and caused to be recirculated into the flowing stream delivered to said web-forming region.

9. In the manufacture of continuous fibrous webs, under pressure-forming conditions, by the use of a confined flowing stream of a fluid suspension of fibrous material which is of generally rectangular cross sectional outline, having a web-forming portion and at least one other portion which forms a boundary layer of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member as said member passes through the web-forming region, the improvement which consists in selectively increasing the fluid pressure in the web-forming portion of the flowing stream in the web-forming region by directing a portion of said flowing stream which is spaced generally vertically from said forming member and which forms one of the boundary layers of said flowing stream into a vortex above said forming member, a portion of the periphery of said vortex tangentially engaging said web-forming portion of the flowing stream in the web-forming region, maintaining said vortex by the controlled addition thereto of substantial amounts of energy, said energy addition being effected by a driving force located at the center of said vortex.

10. In web-forming apparatus of the pressure-forming type, a continuous web-forming member, means for supporting said member and for moving said member through the web-forming region of said apparatus, a source of supply of a fluid suspension of fibrous material, and a flow control unit having an inflow opening connected to said source of supply, and having an outflow opening through which a confined, flowing stream of said fluid is discharged onto said forming member under pressure forming conditions as that member is moved through said web-forming region, said web-forming region being located at the outflow opening of said flow control unit, said flow control unit including means defining the walls of a flow control chamber which is closed except for said inflow and said outflow openings, and through which the fluid delivered to said web-forming region is caused to flow, a cylindrical rotor disposed within said chamber and positioned sufficiently close to said web-forming member as that member passes through said web-forming region to effect control and adjustment of the pressure in the web-forming region, in response to rotation of said rotor and independently of the velocity of said web-forming member, the rotation of said rotor producing a controlled conversion of energy within said flowing stream to thereby increase the fluid pressure in selected portions of the fluid suspension in the web-forming region, and drive means operable to rotate said rotor.

11. Apparatus as defined in claim 10, wherein the rotor has an imperforate surface, wherein the web-forming region has a minimum width in the direction of travel of the web-forming member within the range of from about 2½ to 6½ inches, and wherein the clearance between the roll surface and the forming member in the web-forming region is within the range of from about .25 to .75 inch.

12. In web-forming apparatus of the pressure-forming type, a continuous web-forming member, means for supporting said member and for moving said member through the web-forming region of said apparatus, a source of supply of a fluid suspension of fibrous material, and a flow control unit having an inflow opening connected to said source of supply, and having an outflow opening through which a confined flowing stream of said fluid is discharged onto said forming member under pressure forming conditions as that member is moved through said web-forming region, said web-forming region being located at, and being substantially co-extensive with, the outflow opening of said flow control unit, said flow control unit including means defining the walls of a flow control chamber which is closed except for said inflow and said outflow openings, and through which the fluid delivered to said web-forming region is caused to flow, a cylindrical rotor disposed within said chamber and positioned sufficiently close to said web-forming member as that member passes through said web-forming region to effect control and adjustment of the pressure in the web-forming region, in response to rotation of said rotor and independently of the velocity of said web-forming member, the rotation of said rotor producing a controlled conversion of energy within said flowing stream to thereby increase the fluid pressure in selected portions of the fluid suspension in the web-forming region, and drive means operable to rotate said rotor.

13. In web-forming apparatus of the pressure-forming type, a continuous web-forming member, a breast roll supporting said member for movement into and through the web-forming region of said apparatus, a source of supply of a fluid suspension of fibrous material, and a flow control unit having an inflow opening connected to said source of supply, and having an outflow opening through which a confined, flowing stream of said fluid is discharged onto said forming member under pressure forming conditions as that member is moved through said web-forming region, said web-forming region being located at and being substantially co-extensive with, the outflow opening of said flow control unit, said flow control unit including means defining the walls of a flow control chamber which is closed except for said inflow and said outflow openings, and through which the fluid delivered to said web-forming region is caused to flow, a cylindrical imperforate rotor disposed within said chamber and positioned sufficiently close to said web-forming member as that member passes through said web-forming region to effect control and adjustment of the pressure in the web-forming region, in response to rotation of said rotor and independently of the velocity of said web-forming member, the rotation of said rotor producing a controlled conversion of energy within said flowing stream to thereby increase the fluid pressure in selected portions of the fluid suspension in the web-forming region, and drive means operable to rotate said rotor.

14. Apparatus as defined in claim 13, wherein the breast roll is of the open-surfaced type and wherein the forming member is entirely supported on the breast roll in the web-forming region.

15. Apparatus as defined in claim 13 wherein the breast roll has a solid surface and wherein the web-forming region lies beyond said breast roll.

16. In web-forming apparatus of the pressure-forming type, a continuous web-forming member, means for supporting said member and for moving said member through the web-forming region of said apparatus, a source of supply of a fluid suspension of fibrous material, and a flow control unit having an inflow opening connected to said source of supply, and having an outflow opening through which a confined, flowing stream of said fluid is discharged onto said forming member under pressure forming conditions as that member is moved through said web-forming region, said web-forming region being located at the outflow opening of said flow control unit, said flow control unit including means defining the walls of a flow control chamber which is closed except for said inflow and said outflow openings, and through which the fluid delivered to said web-forming region is caused to flow, a cylindrical rotor disposed within said chamber and positioned sufficiently close to said web-forming member as that member passes through said web-forming region to effect control and adjustment of the pressure in the web-forming region, in response to rotation of said rotor and independently of the velocity of said web-forming member, the rotation of said rotor producing a controlled conversion of energy within said flowing stream to thereby increase the fluid pressure in selected portions of the fluid suspension in the web-forming region, and drive means operable to rotate said rotor, the downstream edge of said outflow opening being defined by a slice plate having an inclined edge portion which defines with said forming member a passageway of decreasing cross sectional area in the direction of movement of the forming member through which the web which is laid down on the forming member passes out of said flow control unit.

17. In web-forming apparatus of the pressure-forming type, a continuous web-forming member, a breast roll supporting said member and for movement into and through the web-forming region of said apparatus, a source of supply of a fluid suspension of fibrous material, and a flow control unit having an inflow opening connected to said source of supply, and having an outflow opening through which a confined, flowing stream of said fluid is discharged onto said forming member under pressure forming conditions as that member is moved through said web-forming region, said web-forming region being located at the outflow opening of said flow control unit, said flow control unit including means defining the walls of a flow control chamber which is closed except for said inflow and said outflow openings, and through which the fluid delivered to said web-forming region is caused to flow, a cylindrical rotor disposed within said chamber and positioned sufficiently close to said web-forming member as that member passes through said web-forming region to effect control and adjustment of the pressure in the web-forming region, in response to rotation of said rotor and independently of the velocity of said web-forming member, the rotation of said rotor producing a controlled conversion of energy within said flowing stream to thereby increase the fluid pressure in selected portions of the fluid suspension in the web-forming region, and drive means operable to rotate said rotor, the upstream edge of said outflow opening being defined by an apron plate and the downstream edge of said outflow opening being defined by a slice plate, said apron plate having a lip on its forward edge which is so positioned relative to said forming member and breast roll that a portion of the flowing stream of fluid which is delivered to said web-forming region will flow, under stable flow conditions, between said lip and said forming member in a direction opposite to the direction of movement of said forming member during the operation of said apparatus, and the leading edge portion of said slice plate being of such shape and being so positioned relative to the surface of said rotor that another portion of the flowing stream of stock which is delivered to said web-forming region is continuously directed away from said web-forming region under stable flow conditions during the operation of said apparatus.

18. In paper making apparatus of the pressure-forming type, a continuous web-forming member, a breast roll supporting said member for movement into and through the web-forming region of said apparatus, a source of supply of paper stock, and a flow control unit having an inflow opening connected to said source of supply, and having an outflow opening through which a confined, flowing stream of said stock is discharged onto said forming member under pressure forming conditions as that member is moved through said web-forming region, said web-forming region being located at, and being substantially co-extensive with, the outflow opening of said flow control unit, said flow control unit including means defining the walls of a flow control chamber which is closed except for said inflow and said outflow openings, and through which the stock delivered to said web-forming region is caused to flow, a cylindrical imperforate rotor disposed within said chamber and positioned sufficiently close to said web-forming member as that member passes through said web-forming region to effect control and adjustment of the pressure in the web-forming region, in response to rotation of said rotor and independently of the velocity of said web-forming member, the rotation of said rotor producing a controlled conversion of energy within said flowing stream to thereby increase the fluid pressure in selected portions of the stock in the web-forming region, and drive means operable to rotate said rotor, the upstream edge of said outflow opening being defined by an apron plate and the downstream edge of said outflow opening being defined by a slice plate, said apron plate having a lip on its forward edge which is so positioned relative to said forming member and breast roll that a portion of the flowing stream of stock which is delivered to said web-forming region will flow, under stable flow conditions, between said lip and said forming member in a direction opposite to the direction of movement of said forming member during the operation of said machine, and the leading edge portion of said slice plate being of such shape and being so positioned relative to the surface of said rotor that another portion of the flowing stream of stock which is delivered to said web-forming region is continuously directed away under stable flow conditions from said web-forming region during the operation of said machine.

References Cited in the file of this patent

UNITED STATES PATENTS

| | | |
|---|---|---|
| 838,686 | Case | Dec. 18, 1906 |
| 1,534,080 | Russell | Apr. 21, 1925 |
| 1,641,987 | Niks | Sept. 13, 1927 |
| 1,809,937 | Hilsheimer | June 16, 1931 |
| 1,818,267 | Niks | Aug. 11, 1931 |
| 1,898,372 | Hyde | Feb. 21, 1933 |
| 1,904,780 | Cofrin | Apr. 18, 1933 |
| 2,034,402 | Leloff | Mar. 17, 1936 |
| 2,060,808 | Kellett et al. | Nov. 17, 1936 |
| 2,118,491 | Chuse | May 24, 1938 |
| 2,134,408 | Kellett | Oct. 25, 1938 |
| 2,154,719 | Berry | Apr. 18, 1939 |
| 2,156,445 | Baxter | May 2, 1939 |
| 2,225,435 | Kellett et al. | Dec. 17, 1940 |
| 2,308,370 | Kellett et al. | Jan. 12, 1943 |
| 2,344,281 | Berry et al. | Mar. 14, 1944 |
| 2,347,130 | Seaborne | Apr. 18, 1944 |
| 2,384,912 | Helin | Sept. 18, 1945 |
| 2,418,600 | Ostertag et al. | Apr. 8, 1947 |
| 2,650,524 | Barnard et al. | Sept. 1, 1953 |

FOREIGN PATENTS

| | | |
|---|---|---|
| 265,490 | Germany | Oct. 9, 1913 |

OTHER REFERENCES

Manufacture of Pulp and Paper 3rd ed., vol. 5, sec. 1, pp. 49, 51, published by McGraw-Hill (1939).

MacNaughton, Paper Trade J., December 26, 1940, pp. 31 and 33.